(12) United States Patent
Viswanathan

(10) Patent No.: US 8,942,973 B2
(45) Date of Patent: Jan. 27, 2015

(54) CONTENT PAGE URL TRANSLATION

(75) Inventor: Narayanaswamy Viswanathan, Palo Alto, CA (US)

(73) Assignee: Language Weaver, Inc., Los Angeles, CA (US)

( * ) Notice: Subject to any disclaimer, the term of this patent is extended or adjusted under 35 U.S.C. 154(b) by 281 days.

(21) Appl. No.: 13/417,071

(22) Filed: Mar. 9, 2012

(65) Prior Publication Data

US 2013/0238310 A1    Sep. 12, 2013

(51) Int. Cl.
*G06F 17/28*    (2006.01)

(52) U.S. Cl.
CPC ..................................... *G06F 17/28* (2013.01)
USPC .................... 704/5; 704/8; 704/277; 715/703

(58) Field of Classification Search
CPC ....................................................... G06F 17/28
See application file for complete search history.

(56) References Cited

U.S. PATENT DOCUMENTS

| | | |
|---|---|---|
| 4,502,128 A | 2/1985 | Okajima et al. |
| 4,599,691 A | 7/1986 | Sakaki et al. |
| 4,615,002 A | 9/1986 | Innes |
| 4,661,924 A | 4/1987 | Okamoto et al. |
| 4,787,038 A | 11/1988 | Doi et al. |
| 4,791,587 A | 12/1988 | Doi |
| 4,800,522 A | 1/1989 | Miyao et al. |
| 4,814,987 A | 3/1989 | Miyao et al. |
| 4,942,526 A | 7/1990 | Okajima et al. |
| 4,980,829 A | 12/1990 | Okajima et al. |
| 5,020,112 A | 5/1991 | Chou |
| 5,088,038 A | 2/1992 | Tanaka et al. |
| 5,091,876 A | 2/1992 | Kumano et al. |
| 5,146,405 A | 9/1992 | Church |
| 5,167,504 A | 12/1992 | Mann |
| 5,181,163 A | 1/1993 | Nakajima et al. |
| 5,212,730 A | 5/1993 | Wheatley et al. |
| 5,218,537 A | 6/1993 | Hemphill et al. |
| 5,220,503 A | 6/1993 | Suzuki et al. |
| 5,267,156 A | 11/1993 | Nomiyama |
| 5,268,839 A | 12/1993 | Kaji |
| 5,295,068 A | 3/1994 | Nishino et al. |

(Continued)

FOREIGN PATENT DOCUMENTS

| | | |
|---|---|---|
| CA | 2408819 | 11/2001 |
| CA | 2475857 | 9/2003 |

(Continued)

OTHER PUBLICATIONS

"Abney, Steven P. , "Parsing by Chunks," 1991, Principle-Based Parsing: Computation and Psycholinguistics, vol. 44,pp. 257-279."

(Continued)

*Primary Examiner* — Brian Albertalli
(74) *Attorney, Agent, or Firm* — Carr & Ferrell LLP

(57) ABSTRACT

The present technology may translate a content of a web page such as content locator (e.g., a uniform resource locator (URL)) from a source language to a target language. The content locator may be associated with a content page. The translation may involve dividing the content locator into segment tokens in a first language, followed by translating, transliterating or not changing a segment token. The processed tokens are then reassembled in a second language. The translation may be provided by a translation module through a content page provided by a network browser.

17 Claims, 7 Drawing Sheets

(56) References Cited

U.S. PATENT DOCUMENTS

| | | | |
|---|---|---|---|
| 5,302,132 A | 4/1994 | Corder | |
| 5,311,429 A | 5/1994 | Tominaga | |
| 5,387,104 A | 2/1995 | Corder | |
| 5,408,410 A | 4/1995 | Kaji | |
| 5,432,948 A | 7/1995 | Davis et al. | |
| 5,442,546 A | 8/1995 | Kaji et al. | |
| 5,477,450 A | 12/1995 | Takeda et al. | |
| 5,477,451 A | 12/1995 | Brown et al. | |
| 5,495,413 A | 2/1996 | Kutsumi et al. | |
| 5,497,319 A | 3/1996 | Chong et al. | |
| 5,510,981 A | 4/1996 | Berger et al. | |
| 5,528,491 A | 6/1996 | Kuno et al. | |
| 5,535,120 A | 7/1996 | Chong et al. | |
| 5,541,836 A | 7/1996 | Church et al. | |
| 5,541,837 A | 7/1996 | Fushimoto | |
| 5,548,508 A | 8/1996 | Nagami | |
| 5,644,774 A | 7/1997 | Fukumochi et al. | |
| 5,675,815 A | 10/1997 | Yamauchi et al. | |
| 5,687,383 A | 11/1997 | Nakayama et al. | |
| 5,696,980 A | 12/1997 | Brew | |
| 5,724,593 A | 3/1998 | Hargrave, III et al. | |
| 5,752,052 A | 5/1998 | Richardson et al. | |
| 5,754,972 A | 5/1998 | Baker et al. | |
| 5,761,631 A | 6/1998 | Nasukawa | |
| 5,761,689 A | 6/1998 | Rayson et al. | |
| 5,768,603 A | 6/1998 | Brown et al. | |
| 5,779,486 A | 7/1998 | Ho et al. | |
| 5,781,884 A | 7/1998 | Pereira et al. | |
| 5,794,178 A | 8/1998 | Caid et al. | |
| 5,805,832 A | 9/1998 | Brown et al. | |
| 5,806,032 A | 9/1998 | Sproat | |
| 5,819,265 A | 10/1998 | Ravin et al. | |
| 5,826,219 A | 10/1998 | Kutsumi | |
| 5,826,220 A | 10/1998 | Takeda et al. | |
| 5,845,143 A | 12/1998 | Yamauchi et al. | |
| 5,848,385 A | 12/1998 | Poznanski et al. | |
| 5,848,386 A | 12/1998 | Motoyama | |
| 5,855,015 A | 12/1998 | Shoham | |
| 5,864,788 A | 1/1999 | Kutsumi | |
| 5,867,811 A | 2/1999 | O'Donoghue | |
| 5,870,706 A | 2/1999 | Alshawi | |
| 5,893,134 A | 4/1999 | O'Donoghue et al. | |
| 5,903,858 A | 5/1999 | Saraki | |
| 5,907,821 A | 5/1999 | Kaji et al. | |
| 5,909,681 A | 6/1999 | Passera et al. | |
| 5,930,746 A | 7/1999 | Ting | |
| 5,966,685 A | 10/1999 | Flanagan et al. | |
| 5,966,686 A | 10/1999 | Heidorn et al. | |
| 5,983,169 A | 11/1999 | Kozma | |
| 5,987,402 A | 11/1999 | Murata et al. | |
| 5,987,404 A | 11/1999 | Della Pietra et al. | |
| 5,991,710 A | 11/1999 | Papineni et al. | |
| 5,995,922 A | 11/1999 | Penteroudakis et al. | |
| 6,018,617 A | 1/2000 | Sweitzer et al. | |
| 6,031,984 A | 2/2000 | Walser | |
| 6,032,111 A | 2/2000 | Mohri | |
| 6,047,252 A | 4/2000 | Kumano et al. | |
| 6,064,819 A | 5/2000 | Franssen et al. | |
| 6,064,951 A | 5/2000 | Park et al. | |
| 6,073,143 A | 6/2000 | Nishikawa et al. | |
| 6,077,085 A | 6/2000 | Parry et al. | |
| 6,092,034 A | 7/2000 | McCarley et al. | |
| 6,119,077 A | 9/2000 | Shinozaki | |
| 6,119,078 A * | 9/2000 | Kobayakawa et al. ............. 704/3 |
| 6,131,082 A | 10/2000 | Hargrave, III et al. | |
| 6,161,082 A | 12/2000 | Goldberg et al. | |
| 6,182,014 B1 | 1/2001 | Kenyon et al. | |
| 6,182,027 B1 | 1/2001 | Nasukawa et al. | |
| 6,185,524 B1 * | 2/2001 | Carus et al. ........... 704/9 |
| 6,205,456 B1 | 3/2001 | Nakao | |
| 6,206,700 B1 | 3/2001 | Brown et al. | |
| 6,223,150 B1 | 4/2001 | Duan et al. | |
| 6,233,544 B1 | 5/2001 | Alshawi | |
| 6,233,545 B1 | 5/2001 | Datig | |
| 6,233,546 B1 | 5/2001 | Datig | |
| 6,236,958 B1 | 5/2001 | Lange et al. | |
| 6,269,351 B1 | 7/2001 | Black | |
| 6,275,789 B1 | 8/2001 | Moser et al. | |
| 6,278,967 B1 | 8/2001 | Akers et al. | |
| 6,278,969 B1 | 8/2001 | King et al. | |
| 6,285,978 B1 | 9/2001 | Bernth et al. | |
| 6,289,302 B1 | 9/2001 | Kuo | |
| 6,304,841 B1 | 10/2001 | Berger et al. | |
| 6,311,152 B1 | 10/2001 | Bai et al. | |
| 6,317,708 B1 | 11/2001 | Witbrock et al. | |
| 6,327,568 B1 | 12/2001 | Joost | |
| 6,330,529 B1 | 12/2001 | Ito | |
| 6,330,530 B1 | 12/2001 | Horiguchi et al. | |
| 6,356,864 B1 | 3/2002 | Foltz et al. | |
| 6,360,196 B1 | 3/2002 | Poznanski et al. | |
| 6,389,387 B1 | 5/2002 | Poznanski et al. | |
| 6,393,388 B1 | 5/2002 | Franz et al. | |
| 6,393,389 B1 | 5/2002 | Chanod et al. | |
| 6,415,250 B1 | 7/2002 | van den Akker | |
| 6,460,015 B1 | 10/2002 | Hetherington et al. | |
| 6,470,306 B1 | 10/2002 | Pringle et al. | |
| 6,473,729 B1 | 10/2002 | Gastaldo et al. | |
| 6,473,896 B1 | 10/2002 | Hicken et al. | |
| 6,480,698 B2 | 11/2002 | Ho et al. | |
| 6,490,549 B1 | 12/2002 | Ulicny et al. | |
| 6,498,921 B1 | 12/2002 | Ho et al. | |
| 6,502,064 B1 | 12/2002 | Miyahira et al. | |
| 6,529,865 B1 | 3/2003 | Duan et al. | |
| 6,535,842 B1 | 3/2003 | Roche et al. | |
| 6,587,844 B1 | 7/2003 | Mohri | |
| 6,604,101 B1 * | 8/2003 | Chan et al. ............... 707/706 |
| 6,609,087 B1 | 8/2003 | Miller et al. | |
| 6,647,364 B1 | 11/2003 | Yumura et al. | |
| 6,691,279 B2 | 2/2004 | Yoden et al. | |
| 6,745,161 B1 | 6/2004 | Arnold et al. | |
| 6,745,176 B2 | 6/2004 | Probert, Jr. et al. | |
| 6,757,646 B2 | 6/2004 | Marchisio | |
| 6,778,949 B2 | 8/2004 | Duan et al. | |
| 6,782,356 B1 | 8/2004 | Lopke | |
| 6,810,374 B2 | 10/2004 | Kang | |
| 6,848,080 B1 | 1/2005 | Lee et al. | |
| 6,857,022 B1 | 2/2005 | Scanlan | |
| 6,885,985 B2 | 4/2005 | Hull | |
| 6,901,361 B1 | 5/2005 | Portilla | |
| 6,904,402 B1 | 6/2005 | Wang et al. | |
| 6,952,665 B1 | 10/2005 | Shimomura et al. | |
| 6,983,239 B1 | 1/2006 | Epstein | |
| 6,993,473 B2 | 1/2006 | Cartus | |
| 6,996,518 B2 | 2/2006 | Jones et al. | |
| 6,996,520 B2 | 2/2006 | Levin | |
| 6,999,925 B2 | 2/2006 | Fischer et al. | |
| 7,013,262 B2 | 3/2006 | Tokuda et al. | |
| 7,016,827 B1 | 3/2006 | Ramaswamy et al. | |
| 7,016,977 B1 | 3/2006 | Dunsmoir et al. | |
| 7,024,351 B2 | 4/2006 | Wang | |
| 7,031,911 B2 | 4/2006 | Zhou et al. | |
| 7,050,964 B2 | 5/2006 | Menzes et al. | |
| 7,085,708 B2 | 8/2006 | Manson | |
| 7,089,493 B2 | 8/2006 | Hatori et al. | |
| 7,103,531 B2 | 9/2006 | Moore | |
| 7,107,204 B1 | 9/2006 | Liu et al. | |
| 7,107,215 B2 | 9/2006 | Ghali | |
| 7,113,903 B1 | 9/2006 | Riccardi et al. | |
| 7,143,036 B2 | 11/2006 | Weise | |
| 7,146,358 B1 | 12/2006 | Gravano et al. | |
| 7,149,688 B2 | 12/2006 | Schalkwyk | |
| 7,171,348 B2 | 1/2007 | Scanlan | |
| 7,174,289 B2 | 2/2007 | Sukehiro | |
| 7,177,792 B2 | 2/2007 | Knight et al. | |
| 7,191,115 B2 | 3/2007 | Moore | |
| 7,194,403 B2 | 3/2007 | Okura et al. | |
| 7,197,451 B1 | 3/2007 | Carter et al. | |
| 7,206,736 B2 | 4/2007 | Moore | |
| 7,209,875 B2 | 4/2007 | Quirk et al. | |
| 7,219,051 B2 | 5/2007 | Moore | |
| 7,239,998 B2 | 7/2007 | Xun | |
| 7,249,012 B2 | 7/2007 | Moore | |
| 7,249,013 B2 | 7/2007 | Al-Onaizan et al. | |
| 7,283,950 B2 | 10/2007 | Pournasseh et al. | |

(56) References Cited

U.S. PATENT DOCUMENTS

| | | |
|---|---|---|
| 7,295,962 B2 | 11/2007 | Marcu |
| 7,295,963 B2 | 11/2007 | Richardson et al. |
| 7,302,392 B1 | 11/2007 | Thenthiruperai et al. |
| 7,319,949 B2 | 1/2008 | Pinkham |
| 7,340,388 B2 | 3/2008 | Soricut et al. |
| 7,346,487 B2 | 3/2008 | Li |
| 7,346,493 B2 | 3/2008 | Ringger et al. |
| 7,349,839 B2 | 3/2008 | Moore |
| 7,349,845 B2 | 3/2008 | Coffman et al. |
| 7,356,457 B2 | 4/2008 | Pinkham et al. |
| 7,369,998 B2 | 5/2008 | Sarich et al. |
| 7,373,291 B2 | 5/2008 | Garst |
| 7,383,542 B2 | 6/2008 | Richardson et al. |
| 7,389,222 B1 | 6/2008 | Langmead et al. |
| 7,389,234 B2 | 6/2008 | Schmid et al. |
| 7,403,890 B2 | 7/2008 | Roushar |
| 7,409,332 B2 | 8/2008 | Moore |
| 7,409,333 B2 | 8/2008 | Wilkinson et al. |
| 7,447,623 B2 | 11/2008 | Appleby |
| 7,454,326 B2 | 11/2008 | Marcu et al. |
| 7,496,497 B2 | 2/2009 | Liu |
| 7,533,013 B2 | 5/2009 | Marcu |
| 7,536,295 B2 | 5/2009 | Cancedda et al. |
| 7,546,235 B2 | 6/2009 | Brockett et al. |
| 7,552,053 B2 | 6/2009 | Gao et al. |
| 7,565,281 B2 | 7/2009 | Appleby |
| 7,574,347 B2 | 8/2009 | Wang |
| 7,580,828 B2 | 8/2009 | D'Agostini |
| 7,580,830 B2 | 8/2009 | Al-Onaizan et al. |
| 7,587,307 B2 | 9/2009 | Cancedda et al. |
| 7,620,538 B2 | 11/2009 | Marcu et al. |
| 7,620,632 B2 | 11/2009 | Andrews |
| 7,624,005 B2 | 11/2009 | Koehn et al. |
| 7,624,020 B2 | 11/2009 | Yamada et al. |
| 7,627,479 B2 | 12/2009 | Travieso et al. |
| 7,680,646 B2 | 3/2010 | Lux-Pogodalla et al. |
| 7,689,405 B2 | 3/2010 | Marcu |
| 7,698,124 B2 | 4/2010 | Menezes et al. |
| 7,698,125 B2 | 4/2010 | Graehl et al. |
| 7,707,025 B2 | 4/2010 | Whitelock |
| 7,711,545 B2 | 5/2010 | Koehn |
| 7,716,037 B2 | 5/2010 | Precoda et al. |
| 7,801,720 B2 | 9/2010 | Satake et al. |
| 7,813,918 B2 | 10/2010 | Muslea et al. |
| 7,822,596 B2 | 10/2010 | Elgazzar et al. |
| 7,925,494 B2 | 4/2011 | Cheng et al. |
| 7,957,953 B2 | 6/2011 | Moore |
| 7,974,833 B2 | 7/2011 | Soricut et al. |
| 8,060,360 B2 | 11/2011 | He |
| 8,145,472 B2 | 3/2012 | Shore et al. |
| 8,214,196 B2 | 7/2012 | Yamada et al. |
| 8,234,106 B2 | 7/2012 | Marcu et al. |
| 8,244,519 B2 | 8/2012 | Bicici et al. |
| 8,265,923 B2 | 9/2012 | Chatterjee et al. |
| 8,275,600 B2 * | 9/2012 | Bilac et al. .......... 704/2 |
| 8,296,127 B2 | 10/2012 | Marcu et al. |
| 8,315,850 B2 * | 11/2012 | Furuuchi et al. ........ 704/7 |
| 8,380,486 B2 | 2/2013 | Soricut et al. |
| 8,433,556 B2 | 4/2013 | Fraser et al. |
| 8,468,149 B1 | 6/2013 | Lung et al. |
| 8,548,794 B2 | 10/2013 | Koehn |
| 8,600,728 B2 | 12/2013 | Knight et al. |
| 8,615,389 B1 | 12/2013 | Marcu |
| 8,655,642 B2 * | 2/2014 | Fux .................. 704/2 |
| 8,666,725 B2 | 3/2014 | Och |
| 8,676,563 B2 | 3/2014 | Soricut et al. |
| 2001/0009009 A1 | 7/2001 | Iizuka |
| 2001/0029455 A1 | 10/2001 | Chin et al. |
| 2002/0002451 A1 | 1/2002 | Sukehiro |
| 2002/0013693 A1 | 1/2002 | Fuji |
| 2002/0040292 A1 | 4/2002 | Marcu |
| 2002/0046018 A1 | 4/2002 | Marcu et al. |
| 2002/0046262 A1 | 4/2002 | Heilig et al. |
| 2002/0059566 A1 | 5/2002 | Delcambre et al. |
| 2002/0078091 A1 | 6/2002 | Vu et al. |
| 2002/0083029 A1 * | 6/2002 | Chun et al. .......... 706/45 |
| 2002/0087313 A1 | 7/2002 | Lee et al. |
| 2002/0099744 A1 | 7/2002 | Coden et al. |
| 2002/0111788 A1 | 8/2002 | Kimpara |
| 2002/0111789 A1 | 8/2002 | Hull |
| 2002/0111967 A1 | 8/2002 | Nagase |
| 2002/0143537 A1 | 10/2002 | Ozawa et al. |
| 2002/0152063 A1 | 10/2002 | Tokieda et al. |
| 2002/0169592 A1 | 11/2002 | Aityan |
| 2002/0188438 A1 | 12/2002 | Knight et al. |
| 2002/0188439 A1 | 12/2002 | Marcu |
| 2002/0198699 A1 | 12/2002 | Greene et al. |
| 2002/0198701 A1 | 12/2002 | Moore |
| 2002/0198713 A1 | 12/2002 | Franz et al. |
| 2003/0009322 A1 | 1/2003 | Marcu |
| 2003/0023423 A1 | 1/2003 | Yamada et al. |
| 2003/0040900 A1 | 2/2003 | D'Agostini |
| 2003/0061022 A1 | 3/2003 | Reinders |
| 2003/0144832 A1 | 7/2003 | Harris |
| 2003/0154071 A1 | 8/2003 | Shreve |
| 2003/0158723 A1 | 8/2003 | Masuichi et al. |
| 2003/0176995 A1 | 9/2003 | Sukehiro |
| 2003/0182102 A1 | 9/2003 | Corston-Oliver et al. |
| 2003/0191626 A1 | 10/2003 | Al-Onaizan et al. |
| 2003/0204400 A1 | 10/2003 | Marcu et al. |
| 2003/0216905 A1 | 11/2003 | Chelba et al. |
| 2003/0217052 A1 | 11/2003 | Rubenczyk et al. |
| 2003/0233222 A1 | 12/2003 | Soricut et al. |
| 2004/0006560 A1 | 1/2004 | Chan et al. |
| 2004/0015342 A1 | 1/2004 | Garst |
| 2004/0024581 A1 | 2/2004 | Koehn et al. |
| 2004/0030551 A1 | 2/2004 | Marcu et al. |
| 2004/0035055 A1 | 2/2004 | Zhu et al. |
| 2004/0044530 A1 | 3/2004 | Moore |
| 2004/0059708 A1 | 3/2004 | Dean et al. |
| 2004/0068411 A1 | 4/2004 | Scanlan |
| 2004/0098247 A1 | 5/2004 | Moore |
| 2004/0102956 A1 | 5/2004 | Levin |
| 2004/0102957 A1 | 5/2004 | Levin |
| 2004/0111253 A1 | 6/2004 | Luo et al. |
| 2004/0115597 A1 | 6/2004 | Butt |
| 2004/0122656 A1 | 6/2004 | Abir |
| 2004/0167768 A1 | 8/2004 | Travieso et al. |
| 2004/0167784 A1 | 8/2004 | Travieso et al. |
| 2004/0193401 A1 | 9/2004 | Ringger et al. |
| 2004/0230418 A1 | 11/2004 | Kitamura |
| 2004/0237044 A1 | 11/2004 | Travieso et al. |
| 2004/0260532 A1 | 12/2004 | Richardson et al. |
| 2005/0021322 A1 | 1/2005 | Richardson et al. |
| 2005/0021517 A1 | 1/2005 | Marchisio |
| 2005/0026131 A1 | 2/2005 | Elzinga et al. |
| 2005/0033565 A1 | 2/2005 | Koehn |
| 2005/0038643 A1 | 2/2005 | Koehn |
| 2005/0055199 A1 | 3/2005 | Ryzchachkin et al. |
| 2005/0055217 A1 | 3/2005 | Sumita et al. |
| 2005/0060160 A1 | 3/2005 | Roh et al. |
| 2005/0075858 A1 | 4/2005 | Pournasseh et al. |
| 2005/0086226 A1 | 4/2005 | Krachman |
| 2005/0102130 A1 | 5/2005 | Quirk et al. |
| 2005/0125218 A1 | 6/2005 | Rajput et al. |
| 2005/0149315 A1 | 7/2005 | Flanagan et al. |
| 2005/0171757 A1 | 8/2005 | Appleby |
| 2005/0204002 A1 | 9/2005 | Friend |
| 2005/0228640 A1 | 10/2005 | Aue et al. |
| 2005/0228642 A1 | 10/2005 | Mau et al. |
| 2005/0228643 A1 | 10/2005 | Munteanu et al. |
| 2005/0234701 A1 | 10/2005 | Graehl et al. |
| 2005/0267738 A1 | 12/2005 | Wilkinson et al. |
| 2006/0004563 A1 | 1/2006 | Campbell et al. |
| 2006/0015320 A1 | 1/2006 | Och |
| 2006/0015323 A1 | 1/2006 | Udupa et al. |
| 2006/0018541 A1 | 1/2006 | Chelba et al. |
| 2006/0020448 A1 | 1/2006 | Chelba et al. |
| 2006/0041428 A1 | 2/2006 | Fritsch et al. |
| 2006/0095248 A1 | 5/2006 | Menezes et al. |
| 2006/0111891 A1 | 5/2006 | Menezes et al. |
| 2006/0111892 A1 | 5/2006 | Menezes et al. |
| 2006/0111896 A1 | 5/2006 | Menezes et al. |
| 2006/0129424 A1 | 6/2006 | Chan |

(56) References Cited

U.S. PATENT DOCUMENTS

| | | | |
|---|---|---|---|
| 2006/0142995 | A1 | 6/2006 | Knight et al. |
| 2006/0150069 | A1 | 7/2006 | Chang |
| 2006/0167984 | A1 | 7/2006 | Fellenstein et al. |
| 2006/0190241 | A1 | 8/2006 | Goutte et al. |
| 2007/0016400 | A1 | 1/2007 | Soricutt et al. |
| 2007/0016401 | A1 | 1/2007 | Ehsani et al. |
| 2007/0033001 | A1 | 2/2007 | Muslea et al. |
| 2007/0050182 | A1 | 3/2007 | Sneddon et al. |
| 2007/0078654 | A1 | 4/2007 | Moore |
| 2007/0078845 | A1 | 4/2007 | Scott et al. |
| 2007/0083357 | A1 | 4/2007 | Moore et al. |
| 2007/0094169 | A1 | 4/2007 | Yamada et al. |
| 2007/0112553 | A1 | 5/2007 | Jacobson |
| 2007/0112555 | A1 | 5/2007 | Lavi et al. |
| 2007/0112556 | A1 | 5/2007 | Lavi et al. |
| 2007/0122792 | A1 | 5/2007 | Galley et al. |
| 2007/0168202 | A1 | 7/2007 | Changela et al. |
| 2007/0168450 | A1 | 7/2007 | Prajapat et al. |
| 2007/0180373 | A1 | 8/2007 | Bauman et al. |
| 2007/0219774 | A1 | 9/2007 | Quirk et al. |
| 2007/0250306 | A1 | 10/2007 | Marcu et al. |
| 2007/0265825 | A1 | 11/2007 | Cancedda et al. |
| 2007/0265826 | A1 | 11/2007 | Chen et al. |
| 2007/0269775 | A1 | 11/2007 | Andreev et al. |
| 2007/0294076 | A1 | 12/2007 | Shore et al. |
| 2008/0052061 | A1 | 2/2008 | Kim et al. |
| 2008/0065478 | A1 | 3/2008 | Kohlmeier et al. |
| 2008/0109209 | A1 | 5/2008 | Fraser et al. |
| 2008/0114583 | A1 | 5/2008 | Al-Onaizan et al. |
| 2008/0154581 | A1 | 6/2008 | Lavi et al. |
| 2008/0183555 | A1 | 7/2008 | Walk |
| 2008/0215418 | A1 | 9/2008 | Kolve et al. |
| 2008/0249760 | A1 | 10/2008 | Marcu et al. |
| 2008/0270109 | A1 | 10/2008 | Och |
| 2008/0270112 | A1 | 10/2008 | Shimohata |
| 2008/0281578 | A1 | 11/2008 | Kumaran et al. |
| 2008/0307481 | A1 | 12/2008 | Panje |
| 2009/0076792 | A1 | 3/2009 | Lawson-Tancred |
| 2009/0083023 | A1 | 3/2009 | Foster et al. |
| 2009/0106017 | A1 | 4/2009 | D'Agostini |
| 2009/0119091 | A1 | 5/2009 | Sarig |
| 2009/0125497 | A1 | 5/2009 | Jiang et al. |
| 2009/0234634 | A1 | 9/2009 | Chen et al. |
| 2009/0241115 | A1 | 9/2009 | Raffo et al. |
| 2009/0326912 | A1 | 12/2009 | Ueffing |
| 2009/0326913 | A1 | 12/2009 | Simard et al. |
| 2010/0005086 | A1* | 1/2010 | Wang et al. .................. 707/5 |
| 2010/0017293 | A1 | 1/2010 | Lung et al. |
| 2010/0042398 | A1 | 2/2010 | Marcu et al. |
| 2010/0138210 | A1 | 6/2010 | Seo et al. |
| 2010/0138213 | A1 | 6/2010 | Bicici et al. |
| 2010/0174524 | A1 | 7/2010 | Koehn |
| 2011/0029300 | A1 | 2/2011 | Marcu et al. |
| 2011/0066643 | A1 | 3/2011 | Cooper et al. |
| 2011/0082683 | A1 | 4/2011 | Soricut et al. |
| 2011/0082684 | A1 | 4/2011 | Soricut et al. |
| 2011/0191410 | A1* | 8/2011 | Refuah et al. ............... 709/203 |
| 2011/0225104 | A1 | 9/2011 | Soricut et al. |
| 2012/0096019 | A1* | 4/2012 | Manickam et al. ........... 707/767 |
| 2012/0253783 | A1 | 10/2012 | Castelli et al. |
| 2012/0265711 | A1 | 10/2012 | Assche |
| 2012/0278302 | A1* | 11/2012 | Choudhury et al. .......... 707/709 |
| 2012/0323554 | A1 | 12/2012 | Hopkins et al. |
| 2013/0103381 | A1 | 4/2013 | Assche |
| 2014/0019114 | A1* | 1/2014 | Travieso et al. ............... 704/2 |

FOREIGN PATENT DOCUMENTS

| | | |
|---|---|---|
| CA | 2480398 | 10/2003 |
| DE | 1488338 | 4/2010 |
| DE | 202005022113.9 | 2/2014 |
| EP | 0469884 | 2/1992 |
| EP | 0715265 | 6/1996 |
| EP | 0933712 A2 | 8/1999 |
| EP | 0933712 A3 | 1/2001 |
| EP | 1488338 | 12/2004 |
| ES | 1488338 | 4/2010 |
| FR | 1488338 | 7/1967 |
| GB | 1488338 | 4/2010 |
| HK | 1072987 | 9/2010 |
| JP | 07244666 | 9/1995 |
| JP | 10011447 | 1/1998 |
| JP | 11272672 | 10/1999 |
| JP | 2004501429 | 1/2004 |
| JP | 2004062726 | 2/2004 |
| JP | 2008101837 | 5/2008 |
| JP | 5452868 | 1/2014 |
| WO | WO03083709 | 10/2003 |
| WO | WO03083710 | 10/2003 |
| WO | WO2007056563 | 5/2007 |
| WO | WO2011041675 | 4/2011 |
| WO | WO2011162947 | 12/2011 |

OTHER PUBLICATIONS

Agbago, A., et al., "True-casing for the Portage System," In Recent Advances in Natural Language Processing (Borovets, Bulgaria), Sep. 21-23, 2005, pp. 21-24.

Al-Onaizan et al., "Statistical Machine Translation," 1999, JHU Summer Tech Workshop, Final Report, pp. 1-42.

"Al-Onaizan et al., "Translating with Scarce Resources," 2000, 17th National Conference of the American Associationfor Artificial Intelligence, Austin, TX, pp. 672-678."

Al-Onaizan, Y. and Knight K., "Machine Transliteration of Names in Arabic Text,"Proceedings of ACL Workshop on Computational Approaches to Semitic Languages. Philadelphia, 2002.

"Al-Onaizan, Y. and Knight, K., "Named Entity Translation: Extended Abstract", 2002, Proceedings of HLT-02, SanDiego, CA."

"Al-Onaizan, Y. and Knight, K., "Translating Named Entities Using Monolingual and Bilingual Resources," 2002, Proc. of the 40th Annual Meeting of the ACL, pp. 400-408."

"Alshawi et al., "Learning Dependency Translation Models as Collections of Finite-State Head Transducers," 2000, Computational Linguistics, vol. 26, pp. 45-60."

Alshawi, Hiyan, "Head Automata for Speech Translation", Proceedings of the ICSLP 96, 1996, Philadelphia, Pennslyvania.

Ambati, V., "Dependency Structure Trees in Syntax Based Machine Translation," Spring 2008 Report <http://www.cs.cmu.edu/~vamshi/publications/DependencyMT_report.pdf>, pp. 1-8.

"Arbabi et al., "Algorithms for Arabic name transliteration," Mar. 1994, IBM Journal of Research and Development,vol. 38, Issue 2, pp. 183-194."

Arun, A., et al., "Edinburgh System Description for the 2006 TC-STAR Spoken Language Translation Evaluation," in TC-STAR Workshop on Speech-to-Speech Translation (Barcelona, Spain), Jun. 2006, pp. 37-41.

Ballesteros, L. et al., "Phrasal Translation and Query Expansion Techniques for Cross-Language Information Retrieval," SIGIR 97, Philadelphia, PA, © 1997, pp. 84-91.

"Bangalore, S. and Rambow, O., "Evaluation Metrics for Generation," 2000, Proc. of the 1st International NaturalLanguage Generation Conf., vol. 14, pp. 1-8."

"Bangalore, S. and Rambow, O., "Using TAGs, a Tree Model, and a Language Model for Generation," May 2000,Workshop TAG+5, Paris."

"Bangalore, S. and Rambow, O., "Corpus-Based Lexical Choice in Natural Language Generation," 2000, Proc. of the 38th Annual ACL, Hong Kong, pp. 464-471."

"Bangalore, S. and Rambow, O., "Exploiting a Probabilistic Hierarchical Model for Generation," 2000, Proc. of 18thconf. on Computational Linguistics, vol. 1, pp. 42-48."

Bannard, C. and Callison-Burch, C., "Paraphrasing with Bilingual Parallel Corpora," In Proceedings of the 43rd Annual Meeting on Association for Computational Linguistics (Ann Arbor, MI, Jun. 25-30, 2005). Annual Meeting of the ACL Assoc. for Computational Linguistics, Morristown, NJ, 597-604. DOI=http://dx.doi.org/10.3115/1219840.

(56) References Cited

OTHER PUBLICATIONS

"Barnett et al., "Knowledge and Natural Language Processing," Aug. 1990, Communications of the ACM, vol. 33, Issue 8, pp. 50-71."

"Baum, Leonard, "An Inequality and Associated Maximization Technique in Statistical Estimation for ProbabilisticFunctions of Markov Processes", 1972, Inequalities 3:1-8."

Berhe, G. et al., "Modeling Service-based Multimedia Content Adaptation in Pervasive Computing," CF '04 (Ischia, Italy) Apr. 14-16, 2004, pp. 60-69.

Boitet, C. et al., "Main Research Issues in Building Web Services for Mutualized, Non-Commercial Translation," Proc. of the 6th Symposium on Natural Language Processing, Human and Computer Processing of Language and Speech, © 2005, pp. 1-11.

"Brants, Thorsten, "TnT—A Statistical Part-of-Speech Tagger," 2000, Proc. of the 6th Applied Natural LanguageProcessing Conference, Seattle."

Brill, Eric, "Transformation-Based Error-Driven Learning and Natural Language Processing: A Case Study in Part of Speech Tagging", 1995, Assocation for Computational Linguistics, vol. 21, No. 4, pp. 1-37.

"Brill, Eric. "Transformation-Based Error-Driven Learning and Natural Language Processing: A Case Study in Partof Speech Tagging", 1995, Computational Linguistics, vol. 21, No. 4, pp. 543-565."

"Brown et al., "A Statistical Approach to Machine Translation," Jun. 1990, Computational Linguistics, vol. 16, No. 2, pp. 79-85."

Brown et al., "Word-Sense Disambiguation Using Statistical Methods," 1991, Proc. of 29th Annual ACL, pp. 264-270.

"Brown et al., "The Mathematics of Statistical Machine Translation: Parameter Estimation," 1993, ComputationalLinguistics, vol. 19, Issue 2, pp. 263-311."

"Brown, Ralf, "Automated Dictionary Extraction for "Knowledge-Free" Example-Based Translation," 1997, Proc. of 7th Int'l Cont. on Theoretical and Methodological Issues in MT, Santa Fe, NM, pp. 111-118."

"Callan et al., "TREC and TIPSTER Experiments with INQUERY," 1994, Information Processing and Management, vol. 31, Issue 3, pp. 327-343."

Callison-Burch, C. et al., "Statistical Machine Translation with Word- and Sentence-aligned Parallel Corpora," In Proceedings of the 42nd Meeting on Assoc. for Computational Linguistics (Barcelona, Spain, Jul. 21-26, 2004). Annual Meeting of the ACL. Assoc. for Computational Linguistics, Morristown, NJ, 1.

"Carl, Michael. "A Constructivist Approach to Machine Translation," 1998, New Methods of Language Processingand Computational Natural Language Learning, pp. 247-256."

"Chen, K. and Chen, H., "Machine Translation: An Integrated Approach," 1995, Proc. of 6th Int'l Cont. on Theoreticaland Methodological Issue in MT, pp. 287-294."

Cheng, P. et al., "Creating Multilingual Translation Lexicons with Regional Variations Using Web Corpora," In Proceedings of the 42nd Annual Meeting on Assoc. for Computational Linguistics (Barcelona, Spain, Jul. 21-26, 2004). Annual Meeting of the ACL. Assoc. for Computational Linguistics, Morristown, NJ, 53.

Cheung et al., "Sentence Alignment in Parallel, Comparable, and Quasi-comparable Corpora", In Proceedings of LREC, 2004, pp. 30-33.

Chinchor, Nancy, "MUC-7 Named Entity Task Definition," 1997, Version 3.5.

"Clarkson, P. and Rosenfeld, R., "Statistical Language Modeling Using the CMU-Cambridge Toolkit", 1997, Proc. ESCA Eurospeech, Rhodes, Greece, pp. 2707-2710."

Cohen et al., "Spectral Bloom Filters," SIGMOD 2003, Jun. 9-12, 2003, ACM pp. 241-252.

Cohen, "Hardware-Assisted Algorithm for Full-text Large-Dictionary String Matching Using n-gram Hashing," 1998, Information Processing and Management, vol. 34, No. 4, pp. 443-464.

Cohen, Yossi, "Interpreter for FUF," (available at ftp:/lftp.cs.bgu.ac.il/pUb/people/elhadad/fuf-life.lf).

Corston-Oliver, Simon, "Beyond String Matching and Cue Phrases: Improving Efficiency and Coverage inDiscourse Analysis", 1998, The AAAI Spring Symposium on Intelligent Text Summarization, pp. 9-15.

Covington, "An Algorithm to Align Words for Historical Comparison", Computational Linguistics, 1996, vol. 22, No. 4, pp. 481-496.

"Dagan, I. and Itai, A., "Word Sense Disambiguation Using a Second Language Monolingual Corpus", 1994, Association forComputational Linguistics, vol. 20, No. 4, pp. 563-596."

"Dempster et al., "Maximum Likelihood from Incomplete Data via the EM Algorithm", 1977, Journal of the RoyalStatistical Society, vol. 39, No. 1, pp. 1-38."

"Diab, M. and Finch, S., "A Statistical Word-Level Translation Model for Comparable Corpora," 2000, In Proc.of theConference on Content Based Multimedia Information Access (RIAO)."

"Diab, Mona, "An Unsupervised Method for Multilingual Word Sense Tagging Using Parallel Corpora: APreliminary Investigation", 2000, SIGLEX Workshop on Word Senses and Multi-Linguality, pp. 1-9."

Eisner, Jason, "Learning Non-Isomorphic Tree Mappings for Machine Translation," 2003, in Proc. of the 41st Meeting of the ACL, pp. 205-208.

Elhadad et al., "Floating Constraints in Lexical Choice", 1996, ACL, vol. 23 No. 2, pp. 195-239.

"Elhadad, M. and Robin, J., "An Overview of SURGE: a Reusable Comprehensive Syntactic RealizationComponent," 1996, Technical Report 96-03, Department of Mathematics and Computer Science, Ben GurionUniversity, Beer Sheva, Israel."

Elhadad, M. and Robin, J., "Controlling Content Realization with Functional Unification Grammars", 1992, Aspects of Automated Natural Language Generation, Dale et al. (eds)., Springer Verlag, pp. 89-104.

"Koehn, P. and Knight, K., "Knowledge Sources for Word-Level Translation Models," 2001, Conference on EmpiricalMethods in Natural Language Processing."

"Kumar, R. and Li, H., "Integer Programming Approach to Printed Circuit Board Assembly Time Optimization," 1995, IEEE Transactions on Components, Packaging, and Manufacturing, Part B: Advance Packaging, vol. 18, No. 4. pp. 720-727."

Kupiec, Julian, "An Algorithm for Finding Noun Phrase Correspondences in Bilingual Corpora," In Proceedings of the 31st Annual Meeting of the ACL, 1993, pp. 17-22.

"Kurohashi, S. and Nagao, M., "Automatic Detection of Discourse Structure by Checking Surface Information inSentences," 1994, Proc. of COL-LING '94, vol. 2, pp. 1123-1127."

"Langkilde, I. and Knight, K., "Generation that Exploits Corpus-Based Statistical Knowledge," 1998, Proc. of theCOLING-ACL, pp. 704-710."

"Langkilde, I. and Knight, K., "The Practical Value of N-Grams in Generation," 1998, Proc. of the 9th InternationalNatural Language Generation Workshop, pp. 248-255."

"Langkilde, Irene, "Forest-Based Statistical Sentence Generation," 2000, Proc. of the 1st Conference on NorthAmerican chapter of the ACL, Seattle, WA, pp. 170-177."

"Langkilde-Geary, Irene, "A Foundation for General-Purpose Natural Language Generation: SentenceRealization Using Probabilistic Models of Language," 2002, Ph.D. Thesis, Faculty of the Graduate School, Universityof Southern California."

"Langkilde-Geary, Irene, "An Empirical Verification of Coverage and Correctness for a General-PurposeSentence Generator," 1998, Proc. 2nd Int'l Natural Language Generation Conference."

"Lee, Yue-Shi, "Neural Network Approach to Adaptive Learning: with an Application to Chinese Homophone Disambiguation," IEEE pp. 1521-1526."

Lita, L., et al., "tRuEcasIng," Proceedings of the 41st Annual Meeting of the Assoc. for Computational Linguistics (In Hinrichs, E. and Roth, D.—editors), pp. 152-159.

Llitjos, A. F. et al., "The Translation Correction Tool: English-Spanish User Studies," Citeseer © 2004, downloaded from: http://gs37.sp.cs.cmu.edu/ari/papers/lrec04/font11, pp. 1-4.

"Mann, G. and Yarowsky, D., "Multipath Translation Lexicon Induction via Bridge Languages," 2001, Proc. of the2nd Conference of the North American Chapter of the ACL, Pittsburgh, PA, pp. 151-158."

(56) References Cited

OTHER PUBLICATIONS

"Manning, C. and Schutze, H., "Foundations of Statistical Natural Language Processing," 2000, The MIT Press, Cambridge, MA [Front Matter]."

"Marcu, D. and Wong, W., "A Phrase-Based, Joint Probability Model for Statistical Machine Translation," 2002, Proc.of ACL-2 conference on Empirical Methods in Natural Language Processing, vol. 10, pp. 133-139."

"Marcu, Daniel, "Building Up Rhetorical Structure Trees," 1996, Proc. of the National Conference on ArtificialIntelligence and Innovative Applications of Artificial Intelligence Conference, vol. 2, pp. 1069-1074."

"Marcu, Daniel, "Discourse trees are good indicators of importance in text," 1999, Advances in Automatic TextSummarization, The MIT Press, Cambridge, MA."

"Marcu, Daniel, "Instructions for Manually Annotating the Discourse Structures of Texts," 1999, DiscourseAnnotation, pp. 1-49."

"Marcu, Daniel, "The Rhetorical Parsing of Natural Language Texts," 1997, Proceedings of ACLIEACL '97, pp. 96-103."

"Marcu, Daniel, "The Rhetorical Parsing, Summarization, and Generation of Natural Language Texts," 1997, Ph. D.Thesis, Graduate Department of Computer Science, University of Toronto."

"Marcu, Daniel, "Towards a Unified Approach to Memory- and Statistical-Based Machine Translation," 2001, Proc.of the 39th Annual Meeting of the ACL, pp. 378-385."

McCallum, A. and Li, W., "Early Results for Named Entity Recognition with Conditional Random Fields, Feature Induction and Web-enhanced Lexicons," In Proceedings of the Seventh Conference on Natural Language Learning at HLT-NAACL, 2003, vol. 4 (Edmonton, Canada), Assoc. for Computational Linguistics, Morristown, NJ, pp. 188-191.

McDevitt, K. et al., "Designing of a Community-based Translation Center," Technical Report TR-03-30, Computer Science, Virginia Tech, © 2003, pp. 1-8.

"Melamed, I. Dan, "A Word-to-Word Model of Translational Equivalence," 1997, Proc. of the 35th Annual Meeting ofthe ACL, Madrid, Spain, pp. 490-497."

"Melamed, I. Dan, "Automatic Evaluation and Uniform Filter Cascades for Inducing N-Best Translation Lexicons," 1995, Proc. of the 3rd Workshop on Very Large Corpora, Boston, MA, pp. 184-198."

"Melamed, I. Dan, "Empirical Methods for Exploiting Parallel Texts," 2001, MIT Press, Cambridge, MA [table ofcontents]."

"Meng et al., "Generating Phonetic Cognates to Handle Named Entities in English-Chinese Cross-LanguageSpoken Document Retrieval," 2001, IEEE Workshop on Automatic Speech Recognition and Understanding. pp. 311-314."

"Metze, F. et al., "The NESPOLE! Speech-to-Speech Translation System," Proc. of the HLT 2002, 2nd Int'l Conf. on Human Language Technology (San Francisco, CA), © 2002, pp. 378-383.

"Mikheev et al., "Named Entity Recognition without Gazeteers," 1999, Proc. of European Chapter of the ACL, Bergen,Norway, pp. 1-8."

"Miike et al., "A Full-Text Retrieval System with a Dynamic Abstract Generation Function," 1994, Proceedings of SI-GIR'94, pp. 152-161."

"Mohri, M. and Riley, M., "An Efficient Algorithm for the N-Best-Strings Problem," 2002, Proc. of the 7th Int. Conf. onSpoken Language Processing (ICSLP'02), Denver, CO, pp. 1313-1316."

Mohri, Mehryar, "Regular Approximation of Context Free Grammars Through Transformation", 2000, pp. 251-261, "Robustness in Language and Speech Technology", Chapter 9, Kluwer Academic Publishers.

"Monasson et al., "Determining Computational Complexity from Characteristic 'Phase Transitions'," Jul. 1999, NatureMagazine, vol. 400, pp. 133-137."

"Mooney, Raymond, "Comparative Experiments on Disambiguating Word Senses: An Illustration of the Role of Biasin Machine Learning," 1996, Proc. of the Conference on Empirical Methods in Natural Language Processing, pp. 82-91."

Nagao, K. et al., "Semantic Annotation and Transcoding: Making Web Content More Accessible," IEEE Multimedia, vol. 8, Issue 2 Apr.-Jun. 2001, pp. 69-81.

"Nederhof, M. and Satta, G., "IDL-Expressions: A Formalism for Representing and Parsing Finite Languages inNatural Language Processing," 2004, Journal of Artificial Intelligence Research, vol. 21, pp. 281-287."

"Nieben, S. and Ney, H, "Toward Hierarchical Models for Statistical Machine Translation of Inflected Languages," 2001,Data-Driven Machine Translation Workshop, Toulouse, France, pp. 47-54."

Norvig, Peter, "Techniques for Automatic Memoization with Applications to Context-Free Parsing", Compuational Linguistics,1991, pp. 91-98, vol. 17, No. 1.

"Och et al., "Improved Alignment Models for Statistical Machine Translation," 1999, Proc. of the Joint Conf. ofEmpirical Methods in Natural Language Processing and Very Large Corpora, pp. 20-28."

Och et al. "A Smorgasbord of Features for Statistical Machine Translation." HLTNAACL Conference. Mar. 2004, 8 pages.

Och, F., "Minimum Error Rate Training in Statistical Machine Translation," In Proceedings of the 41st Annual Meeting on Assoc. for Computational Linguistics—vol. 1 (Sapporo, Japan, Jul. 7-12, 2003). Annual Meeting of the ACL. Assoc. for Computational Linguistics, Morristown, NJ, 160-167. DOI= http://dx.doi.org/10.3115/1075096.

"Och, F. and Ney, H, "Improved Statistical Alignment Models," 2000, 38th Annual Meeting of the ACL, Hong Kong, pp. 440-447."

Och, F. and Ney, H., "Discriminative Training and Maximum Entropy Models for Statistical Machine Translation," 2002, Proc. of the 40th Annual Meeting of the ACL, Philadelphia, PA, pp. 295-302.

Och, F. and Ney, H., "A Systematic Comparison of Various Statistical Alignment Models," Computational Linguistics, 2003, 29:1, 19-51.

"Papineni et al., "Bleu: a Method for Automatic Evaluation of Machine Translation," 2001, IBM Research Report, RC22176(WQ102-022)."

Perugini, Saviero et al., "Enhancing Usability in CITIDEL: Multimodal, Multilingual and Interactive Visualization Interfaces," JCDL '04, Tucson, AZ, Jun. 7-11, 2004, pp. 315-324.

Petrov et al., "Learning Accurate, Compact and Interpretable Tree Annotation," Jun. 4-9, 2006, in Proc. of the Human Language Technology Conference of the North American Chapter of the ACL, pp. 433-440.

"Pla et al., "Tagging and Chunking with Bigrams," 2000, Proc. of the 18th Conference on Computational Linguistics, vol. 2, pp. 614-620."

Qun, Liu, "A Chinese-English Machine Translation System Based on Micro-Engine Architecture," An Int'l Conference on Translation and Information Technology, Hong Kong, Dec. 2000, pp. 1-10.

Rapp, Reinhard, Automatic Identification of Word Translations from Unrelated English and German Corpora, 1999, 37th Annual Meeting of the ACL, pp. 519-526.

Zhang et al., "Synchronous Binarization for Machine Translations," Jun. 4-9, 2006, in Proc. of the Human Language Technology Conference of the North American Chapter of the ACL, pp. 256-263.

Zhang et al., "Distributed Language Modeling for N-best List Reranking," In Proceedings of the 2006 Conference on Empirical Methods in Natural Language Processing (Sydney, Australia, Jul. 22-23, 2006). ACL Workshops. Assoc. for Computational Linguistics, Morristown, NJ, 216-223.

"Patent Cooperation Treaty International Preliminary Report on Patentability and the Written Opinion, Internationalapplication No. PCT/US2008/004296, Oct. 6, 2009, 5 pgs."

Document, Wikipedia.com, web.archive.org (Feb. 24, 2004) <http://web.archive.org/web/20040222202831 /http://en.wikipedia.org/wikiiDocument>, Feb, 24, 2004.

Identifying, Dictionary.com, wayback.archive.org (Feb. 28, 2007) <http://wayback.archive.org/web/200501 01 OOOOO*/http:////dictionary.reference.com//browse//identifying>, Feb 28, 2005 <http://web.archive.org/web/20070228150533/http://dictionary.reference.com/browse/identifying>.

Koehn, P. et al, "Statistical Phrase-Based Translation," Proceedings of HLT-NAACL 2003 Main Papers , pp. 48-54 Edmonton, May-Jun. 2003.

Abney, S.P., "Stochastic Attribute Value Grammars", Association for Computional Linguistics, 1997, pp. 597-618.

(56) References Cited

OTHER PUBLICATIONS

Fox, H., "Phrasal Cohesion and Statistical Machine Translation" Proceedings of the Conference on Empirical Methods in Natural Language Processing, Philadelphia, Jul. 2002, pp. 304-311. Association for Computational Linguistics. <URL: http://acl.idc.upenn.edu/W/W02/W02-1039.pdf>.
Tillman, C., et al, "Word Reordering and a Dynamic Programming Beam Search Algorithm for Statistical Machine Translation," 2003, Association for Computational Linguistics, vol. 29, No. 1, pp. 97-133 <URL: http://acl.ldc.upenn.edu/J/J03/J03-1005.pdf>.
Wang, W., et al. "Capitalizing Machine Translation" in HLT-NAACL '06 Proceedings Jun. 2006. <http://www.isi.edu/natural-language/mt/hlt-naacl-06-wang.pdf>.
Langlais, P. et al., "TransType: a Computer-Aided Translation Typing System" EmbedMT '00 ANLP-NAACL 2000 Workshop: Embedded Machine Translation Systems, 2000, pp. 46-51. <http://aclidc.upenn.edu/W/W00/W00-0507.pdf>.
"Elhadad, Michael, "FUF: the Universal Unifier User Manual Version 5.2", 1993, Department of Computer Science,Ben Gurion University, Beer Sheva, Israel."
"Elhadad, Michael, "Using Argumentation to Control Lexical Choice: A Functional Unification Implementation",1992, Ph.D. Thesis, Graduate School of Arts and Sciences, Columbia University."
"Elhadad, M. and Robin, J., "SURGE: a Comprehensive Plug-in Syntactic Realization Component for TextGeneration", 1999 (available at http://www.cs.bgu.ac.il/-elhadad/pub.html)".
Fleming, Michael et al., "Mixed-Initiative Translation of Web Pages," AMTA 2000, LNAI 1934, Springer-Verlag, Berlin, Germany, 2000, pp. 25-29.
Och, Franz Josef and Ney, Hermann, "Improved Statistical Alignment Models" ACLOO:Proc. of the 38th Annual Meeting of the Association for Computational Lingustics, 'Online! Oct. 2-6, 2000, pp. 440-447, XP002279144 Hong Kong, China Retrieved from the Internet: <URL:http://www-i6.informatik.rwth-aachen.de/Colleagues/och/ACLOO.ps> retrieved on May 6, 2004! abstract.
Ren, Fuji and Shi, Hongchi, "Parallel Machine Translation: Principles and Practice," Engineering of Complex Computer Systems, 2001 Proceedings, Seventh IEEE Intl Conference, pp. 249-259, 2001.
Fung et al, "Mining Very-Non-Parallel Corpora: Parallel Sentence and Lexicon Extraction via Bootstrapping and EM", in EMNLP 2004.
"Fung, P. and Yee, L., "An IR Approach for Translating New Words from Nonparallel, Comparable Texts", 1998,36th Annual Meeting of the ACL, 17th International Conference on Computational Linguistics, pp. 414-420."
"Fung, Pascale, "Compiling Bilingual Lexicon Entries From a Non-Parallel English-Chinese Corpus", 1995, Proc, ofthe Third Workshop on Very Large Corpora, Boston, MA, pp. 173-183."
"Gale, W. and Church, K., "A Program for Aligning Sentences in Bilingual Corpora," 1991, 29th Annual Meeting ofthe ACL, pp. 177-183."
Gale, W. and Church, K., "A Program for Aligning Sentences in Bilingual Corpora," 1993, Computational Linguisitcs, vol. 19, No. 1, pp. 75-102.
Galley et al., "Scalable Inference and Training of Context-Rich Syntactic Translation Models," Jul. 2006, in Proc. of the 21st International Conference on Computational Linguistics, pp. 961-968.
Galley et al., "What's in a translation rule?", 2004, in Proc. of HLT/NAACL '04, pp. 1-8.
Gaussier et al, "A Geometric View on Bilingual Lexicon Extraction from Comparable Corpora", In Proceedings of ACL Jul. 2004.
"Germann et al., "Fast Decoding and Optimal Decoding for Machine Translation", 2001, Proc. of the 39th AnnualMeeting of the ACL, Toulouse, France, pp. 228-235."
"Germann, Ulrich: "Building a Statistical Machine Translation System from Scratch: How Much Bang for theBuck Can We Expect?" Proc. of the Data-Driven MT Workshop of ACL-01, Toulouse, France, 2001."

Gildea, D., "Loosely Tree-based Alignment for Machine Translation," In Proceedings of the 41st Annual Meeting on Assoc. for Computational Linguistics—vol. 1 (Sapporo, Japan, Jul. 7-12, 2003). Annual Meeting of the ACL Assoc. for Computational Linguistics, Morristown, NJ, 80-87. DOI=http://dx.doi.org/10.3115/1075096.1075107.
"Grefenstette, Gregory, "The World Wide Web as a Resource for Example-Based Machine TranslationTasks", 1999, Translating and the Computer 21, Proc. of the 21 st International Cant. on Translating and theComputer. London, UK, 12 pp."
Grossi et al, "Suffix Trees and Their Applications in String Algorithms", In. Proceedings of the 1st South American Workshop on String Processing, Sep. 1993, pp. 57-76.
Gupta et al., "Kelips: Building an Efficient and Stable P2P DHT thorough Increased Memory and Background Overhead," 2003 IPTPS, LNCS 2735, pp. 160-169.
Habash, Nizar, "The Use of a Structural N-gram Language Model in Generation-Heavy Hybrid Machine Translation," University of Maryland, Univ. Institute for Advance Computer Studies, Sep. 8, 2004.
"Hatzivassiloglou, V. et al., "Unification-Based Glossing", 1995, Proc. of the International Joint Conference onArtificial Intelligence, pp. 1382-1389."
Huang et al., "Relabeling Syntax Trees to Improve Syntax-Based Machine Translation Quality," Jun. 4-9, 2006, in Proc. of the Human Language Techology Conference of the North Americna Chapter of the ACL, pp. 240-247.
Ide, N. and Veronis, J., "Introduction to the Special Issue on Word Sense Disambiguation: The State of the Art", Mar. 1998, Computational Linguistics, vol. 24, Issue 1, pp. 2-40.
Bikel, D., Schwartz, R., and Weischedei, R., "An Algorithm that Learns What's in a Name," Machine Learning 34, 211-231 (1999).
Imamura et al., "Feedback Cleaning of Machine Translation Rules Using Automatic Evaluation," 2003 Computational Linguistics, pp. 447-454.
Imamura, Kenji, "Hierarchical Phrase Alignment Harmonized with Parsing", 2001, in Proc. of NLPRS, Tokyo.
"Jelinek, F., "Fast Sequential Decoding Algorithm Using a Stack", Nov. 1969, IBM J. Res. Develop., vol. 13, No. 6, pp. 675-685."
"Jones, K. Sparck, "Experiments in Relevance Weighting of Search Terms", 1979, Information Processing &Management, vol. 15, Pergamon Press Ltd., UK, pp. 133-144."
Klein et al., "Accurate Unlexicalized Parsing," Jul. 2003, in Proc. of the 41st Annual Meeting of the ACL, pp. 423-430.
"Knight et al., "Integrating Knowledge Bases and Statistics in MT," 1994, Proc. of the Conference of the Associationfor Machine Translation in the Americas."
"Knight et al., "Filling Knowledge Gaps in a Broad-Coverage Machine Translation System", 1995, Proc. ofthel4th International Joint Conference on Artificial Intelligence, Montreal, Canada, vol. 2, pp. 1390-1396."
"Knight, K. and Al-Onaizan, Y., "A Primer on Finite-State Software for Natural Language Processing", 1999 (available at http://www.isi.edullicensed-sw/carmel)."
Knight, K. and Al-Onaizan, Y., "Translation with Finite-State Devices," Proceedings of the 4th AMTA Conference, 1998.
"Knight, K. and Chander, I., "Automated Postediting of Documents," 1994, Proc. of the 12th Conference on ArtificialIntelligence, pp. 779-784."
Knight, K. and Graehl, J., "Machine Transliteration", 1997, Proc. of the ACL-97, Madrid, Spain, pp. 128-135.
"Knight, K. and Hatzivassiloglou, V., "Two-Level, Many-Paths Generation," 1995, Proc. of the 33rd AnnualConference of the ACL, pp. 252-260."
"Knight, K. and Luk, S., "Building a Large-Scale Knowledge Base for Machine Translation," 1994, Proc. of the 12thConference on Artificial Intelligence, pp. 773-778."
"Knight, K. and Marcu, D., "Statistics-Based Summarization—Step One: Sentence Compression," 2000, AmericanAssociation for Artificial Intelligence Conference, pp. 703-710."
"Knight, K. and Yamada, K., "A Computational Approach to Deciphering Unknown Scripts," 1999, Proc. of the ACLWorkshop on Unsupervised Learning in Natural Language Processing."

(56) References Cited

OTHER PUBLICATIONS

"Knight, Kevin,"A Statistical MT Tutorial Workbook," 1999, JHU Summer Workshop (available at http://www.isI.edu/natural-language/mUwkbk.rtf)."
Knight, Kevin, "Automating Knowledge Acquisition for Machine Translation," 1997, AI Magazine, vol. 18, No. 4.
"Knight, Kevin, "Connectionist Ideas and Algorithms," Nov. 1990, Communications of the ACM, vol. 33, No. 11, pp. 59-74."
"Knight, Kevin, "Decoding Complexity in Word-Replacement Translation Models", 1999, Computational Linguistics, vol. 25, No. 4."
"Knight, Kevin, "Integrating Knowledge Acquisition and Language Acquisition", May 1992, Journal of AppliedIntelligence, vol. 1, No. 4."
"Knight, Kevin, "Learning Word Meanings by Instruction," 1996, Proc. of the D National Conference on ArtificialIntelligence, vol. 1, pp. 447-454."
Knight, Kevin, "Unification: A Multidisciplinary Survey," 1989, ACM Computing Surveys, vol. 21, No. 1.
Koehn, Philipp, "Noun Phrase Translation," A PhD Dissertation for the University of Southern California, pp. xiii, 23, 25-57, 72-81, Dec. 2003.
"Koehn, P. and Knight, K., "ChunkMT: Statistical Machine Translation with Richer Linguistic Knowledge," Apr. 2002,Information Sciences Institution."
"Koehn, P. and Knight, K., "Estimating Word Translation Probabilities from Unrelated Monolingual Corpora Usingthe EM Algorithm," 2000, Proc. of the 17th meeting of the AAAI."
Ueffing et al., "Using Pos Information for Statistical Machine Translation into Morphologically Rich Languages," in EACL, 2003: Proceedings of the Tenth Conference on European Chapter of the Association for Computational Linguistics, pp. 347-354.
Frederking et al., "Three Heads are Better Than One," In Proceedings of the 4th Conference on Applied Natural Language Processing, Stuttgart, Germany, 1994, pp. 95-100.
Och et al., "Discriminative Training and Maximum Entropy Models for Statistical Machine Translation," In Proc. of the 40th Annual Meeting of the Association for Computational Linguistics (ACL), Philadelphia, PA, 2002.
Yasuda et al., "Automatic Machine Translation Selection Scheme to Output the Best Result," Proc of LREC, 2002, pp. 525-528.
Papineni et al., "Bleu: a Method for Automatic Evaluation of Machine Translation", Proc. of the 40th Annual Meeting of the Association for Computational Linguistics (ACL), Jul. 2002, pp. 311-318.
Shaalan et al., "Machine Translation of English Noun Phrases into Arabic", (2004), vol. 17, No. 2, International Journal of Computer Processing of Oriental Languages, 14 pages.
Isahara et al., "Analysis, Generation and Semantic Representation in CONTRAST—A Context-Based Machine Translation System", 1995, Systems and Computers in Japan, vol. 26, No. 14, pp. 37-53.
Proz.com, Rates for proofreading versus Translating, http://www.proz.comfforum/business_issues/202-rates_for_proofreading_versus_translating.html, Apr. 23, 2009, retrieved Jul. 13, 2012.
Celine, Volume discounts on large translation project, naked translations, http://www.nakedtranslations.com/en/2007/volume-discounts-on-large-translation-projects/, Aug. 1, 2007, retrieved Jul. 16, 2012.
Graehl, J and Knight, K, May 2004, Training Tree Transducers, In NAACL-HLT (2004), pp. 105-112.
Niessen et al, "Statistical machine translation with scarce resources using morphosyntactic information", Jun. 2004, Computational Linguistics, vol. 30, issue 2, pp. 181-204.
Liu et al., "Context Discovery Using Attenuated Bloom Filters in Ad-Hoc Networks," Springer, pp. 13-25, 2006.
First Office Action mailed Jun. 7, 2004 in Canadian Patent Application 2408819, filed May 11, 2001.
First Office Action mailed Jun. 14, 2007 in Canadian Patent Application 2475857, filed Mar. 11, 2003.
Office Action mailed Mar. 26, 2012 in German Patent Application 10392450.7, filed Mar. 28, 2003.
First Office Action mailed Nov. 5, 2008 in Canadian Patent Application 2408398, filed Mar. 27, 2003.
Second Office Action mailed Sep. 25, 2009 in Canadian Patent Application 2408398, filed Mar. 27, 2003.
First Office Action mailed Mar. 1, 2005 in European Patent Application No. 03716920.8, filed Mar. 27, 2003.
Second Office Action mailed Nov. 9, 2006 in European Patent Application No. 03716920.8, filed Mar. 27, 2003.
Third Office Action mailed Apr. 30, 2008 in European Patent Application No. 03716920.8, filed Mar. 27, 2003.
Office Action mailed Oct. 25, 2011 in Japanese Patent Application 2007-536911 filed Oct. 12, 2005.
Office Action mailed Jul. 24, 2012 in Japanese Patent Application 2007-536911 filed Oct. 12, 2005.
Final Office Action mailed Apr. 9, 2013 in Japanese Patent Application 2007-536911 filed Oct. 12, 2005.
Office Action mailed May 13, 2005 in Chinese Patent Application 1812317.1, filed May 11, 2001.
Office Action mailed Apr. 21, 2006 in Chinese Patent Application 1812317.1, filed May 11, 2001.
Office Action mailed Jul. 19, 2006 in Japanese Patent Application 2003-577155, filed Mar. 11, 2003.
Office Action mailed Mar. 1, 2007 in Chinese Patent Application 3805749.2, filed Mar. 11, 2003.
Office Action mailed Feb. 27, 2007 in Japanese Patent Application 2002-590018, filed May 13, 2002.
Office Action mailed Jan. 26, 2007 in Chinese Patent Application 3807018.9, filed Mar. 27, 2003.
Office Action mailed Dec. 7, 2005 in Indian Patent Application 2283/DELNP/2004, filed Mar. 11, 2003.
Office Action mailed Mar. 31, 2009 in European Patent Application 3714080.3, filed Mar. 11, 2003.
Agichtein et al., "Snowball: Extracting Information from Large Plain-Text Collections," ACM DL '00, the Fifth ACM Conference on Digital Libraries, Jun. 2, 2000, San Antonio, TX, USA.
Satake, Masaomi, "Anaphora Resolution for Named Entity Extraction in Japanese Newspaper Articles," Master's Thesis [online], Feb. 15, 2002, School of Information Science, JAIST, Nomi, Ishikaw, Japan.
Office Action mailed Aug. 29, 2006 in Japanese Patent Application 2003-581064, filed Mar. 27, 2003.
Office Action mailed Jan. 26, 2007 in Chinese Patent Application 3807027.8, filed Mar. 28, 2003.
Office Action mailed Jul. 25, 2006 in Japanese Patent Application 2003-581063, filed Mar. 28, 2003.
Huang et al., "A syntax-directed translator with extended domain of locality," Jun. 9, 2006, In Proceedings of the Workshop on Computationally Hard Problems and Joint Inference in Speech and Language Processing, pp. 1-8, New York City, New York, Association for Computational Linguistics.
Melamed et al., "Statistical machine translation by generalized parsing," 2005, Technical Report 05-001, Proteus Project, New York University, http://nlp.cs.nyu.edu/pubs/.
Galley et al., "Scalable Inference and Training of Context-Rich Syntactic Translation Models," Jul. 2006, In Proceedings of the 21st International Conference on Computational Linguistics and 44th Annual Meeting of the ACL, pp. 961-968.
Huang et al., "Statistical syntax-directed translation with extended domain of locality," Jun. 9, 2006, In Proceedings of AMTA, pp. 1-8.
"Rapp, Reinhard, "Identifying Word Translations in Non-Parallel Texts," 1995, 33rd Annual Meeting of the ACL, pp. 320-322."
Rayner et al., "Hybrid Language Processing in the Spoken Language Translator," IEEE, pp. 107-110.
"Resnik, P. and Smith, A., "The Web as a Parallel Corpus," Sep. 2003, Computational Linguistics, SpecialIssue on Web as Corpus, vol. 29, Issue 3, pp. 349-380."
"Resnik, P. and Yarowsky, D. "A Perspective on Word Sense Disambiguation Methods and Their Evaluation," 1997, Proceedings of SIGLEX '97, Washington, D.C., pp. 79-86."
"Resnik, Philip, "Mining the Web for Bilingual Text," 1999, 37th Annual Meeting of the ACL, College Park, MD, pp. 527-534."
Rich, E. and Knight, K., "Artificial Intelligence, Second Edition," 1991, McGraw-Hill Book Company [Front Matter].

(56) References Cited

OTHER PUBLICATIONS

"Richard et al., "Visiting the Traveling Salesman Problem with Petri nets and application in the glass industry," Feb. 1996, IEEE Emerging Technologies and Factory Automation, pp. 238-242."
"Robin, Jacques, "Revision-Based Generation of Natural Language Summaries Providing Historical Background: Corpus-Based Analysis, Design Implementation and Evaluation," 1994, Ph.D. Thesis, Columbia University, New York."
Rogati et al., "Resource Selection for Domain-Specific Cross-Lingual IR," ACM 2004, pp. 154-161.
Zhang, R. et al., "The NiCT-ATR Statistical Machine Translation System for the IWSLT 2006 Evaluation," submitted to IWSLT, 2006.
"Russell, S. and Norvig, P., "Artificial Intelligence: A Modern Approach," 1995, Prentice-Hall, Inc., New Jersey [Front Matter]."
"Sang, E. and Buchholz, S., "Introduction to the CoNLL-2000 Shared Task: Chunking," 2002, Proc. ofCoNLL-2000 and LLL-2000, Lisbon, Portugal, pp. 127-132."
Schmid, H., and Schulte im Walde, S., "Robust German Noun Chunking With a Probabilistic Context-Free Grammar," 2000, Proc. of the 18th Conference on Computational Linguistics, vol. 2, pp. 726-732.
"Schutze, Hinrich, "Automatic Word Sense Discrimination," 1998, Computational Linguistics, Special Issue on WordSense Disambiguation, vol. 24, Issue 1, pp. 97-123."
"Selman et al., "A New Method for Solving Hard Satisfiability Problems," 1992, Proc. of the 10th National Conferenceon Artificial Intelligence, San Jose, CA, pp. 440-446."
Kumar, S. and Byrne, W., "Minimum Bayes-Risk Decoding for Statistical Machine Translation." HLTNAACL Conference. Mar. 2004, 8 pages.
"Shapiro, Stuart (ed.), "Encyclopedia of Artificial Intelligence, 2nd edition", vol. D 2,1992, John Wiley & Sons Inc; "Unification" article, K. Knight, pp. 1630-1637."
Shirai, S., "A Hybrid Rule and Example-based Method for Machine Translation," NTT Communication Science Laboratories, pp. 1-5.
"Sobashima et al., "A Bidirectional Transfer-Driven Machine Translation System for Spoken Dialogues," 1994, Proc.of 15th Conference on Computational Linguistics, vol. 1, pp. 64-68."
"Soricut et al., "Using a Large Monolingual Corpus to Improve Translation Accuracy," 2002, Lecture Notes in Computer Science, vol. 2499, Proc. of the 5th Conference of the Association for Machine Translation in theAmericas on Machine Translation: From Research to Real Users, pp. 155-164."
"Stalls, B. and Knight, K., "Translating Names and Technical Terms in Arabic Text," 1998, Proc. of the COLING/ACL Workkshop on Computational Approaches to Semitic Language."
"Sumita et al.,""A Discourse Structure Analyzer for Japanese Text," 1992, Proc. of the International Conference onFifth Generation Computer Systems," vol. 2, pp. 1133-1140."
"Sun et al., "Chinese Named Entity Identification Using Class-based Language Model," 2002, Proc. of 19thInternational Conference on Computational Linguistics, Taipei, Taiwan, vol. 1, pp. 1-7."
Tanaka, K. and Iwasaki, H. "Extraction of Lexical Translations from Non-Aligned Corpora," Proceedings of COLING 1996.
Taskar, B., et al., "A Discriminative Matching Approach to Word Alignment," In Proceedings of the Conference on Human Language Technology and Empirical Methods in Natural Language Processing (Vancouver, BC, Canada, Oct. 6-8, 2005). Human Language Technology Conference. Assoc. for Computational Linguistics, Morristown, NJ.
"Taylor et al., "The Penn Treebank: An Overview," in A. Abeill (ed.), D Treebanks: Building and Using ParsedCorpora, 2003, pp. 5-22."
"Tiedemann, Jorg, "Automatic Construction of Weighted String Similarity Measures," 1999, In Proceedings ofthe Joint SIGDAT Conference on Emperical Methods in Natural Language Processing and Very Large Corpora."

"Tillman, C. and Xia, F., "A Phrase-Based Unigram Model for Statistical Machine Translation," 2003, Proc. of theNorth American Chapter of the ACL on Human Language Technology, vol. 2, pp. 106-108."
"Tillmann et al., "A DP Based Search Using Monotone Alignments in Statistical Translation," 1997, Proc. Of theAnnual Meeting of the ACL, pp. 366-372."
Tomas, J., "Binary Feature Classification for Word Disambiguation in Statistical Machine Translation," Proceedings of the 2nd Int'l. Workshop on Pattern Recognition, 2002, pp. 1-12.
Uchimoto, K. et al., "Word Translation by Combining Example-Based Methods and Machine Learning Models," Natural LanguageProcessing (Shizen Gengo Shori), vol. 10, No. 3, Apr. 2003, pp. 87-114.
Uchimoto, K. et al., "Word Translation by Combining Example-based Methods and Machine Learning Models," Natural LanguageProcessing (Shizen Gengo Shori), vol. 10, No. 3, Apr. 2003, pp. 87-114. (English Translation).
"Ueffing et al., "Generation of Word Graphs in Statistical Machine Translation," 2002, Proc. of Empirical Methods inNatural Language Processing (EMNLP), pp. 156-163."
Varga et al., "Parallel Corpora for Medium Density Languages", In Proceedings of RANLP 2005, pp. 590-596.
"Veale, T. and Way, A., "Gaijin: A Bootstrapping, Template-Driven Approach to Example-Based MT," 1997, Proc. ofNew Methods in Natural Language Processing (NEMPLP97), Sofia, Bulgaria."
Vogel et al., "The CMU Statistical Machine Translation System," 2003, Machine Translation Summit IX, New Orleans, LA.
"Vogel et al., "The Statistical Translation Module in the Verbmobil System," 2000, Workshop on Multi-Lingual SpeechCommunication, pp. 69-74."
"Vogel, S. and Ney, H., "Construction of a Hierarchical Translation Memory," 2000, Proc. of Cooling 2000, Saarbrucken, Germany, pp. 1131-1135."
"Wang, Y. and Waibel, A., "Decoding Algorithm in Statistical Machine Translation," 1996, Proc. of the 35th AnnualMeeting of the ACL, pp. 366-372."
"Wang, Ye-Yi, "Grammar Inference and Statistical Machine Translation," 1998, Ph.D Thesis, Carnegie MellonUniversity, Pittsburgh, PA."
"Watanabe et al., "Statistical Machine Translation Based on Hierarchical Phrase Alignment," 2002, 9th InternationalConference on Theoretical and Methodological Issues in Machin Translation (TMI-2002), Keihanna, Japan, pp. 188-198."
"Witbrock, M. and Mittal, V., "Ultra-Summarization: A Statistical Approach to Generating Highly Condensed Non-Extractive Summaries," 1999, Proc. of SIGIR '99, 22nd International Conference on Research and Development inInformation Retrieval, Berkeley, CA, pp. 315-316."
"Wu, Dekai, "A Polynomial-Time Algorithm for Statistical Machine Translation," 1996, Proc. of 34th Annual Meeting ofthe ACL, pp. 152-158."
"Wu, Dekai, "Stochastic Inversion Transduction Grammars and Bilingual Parsing of Parallel Corpora," 1997, Computational Linguistics, vol. 23, Issue 3, pp. 377-403."
"Yamada, K. and Knight, K. "A Syntax-Based Statistical Translation Model," 2001, Proc. of the 39th AnnualMeeting of the ACL, pp. 523-530."
"Yamada, K. and Knight, K., "A Decoder for Syntax-Based Statistical MT," 2001, Proceedings of the 40th AnnualMeeting of the ACL, pp. 303-310."
Yamada K., "A Syntax-Based Statistical Translation Model," 2002 PhD Dissertation, pp. 1-141.
"Yamamoto et al., "A Comparative Study on Translation Units for Bilingual Lexicon Extraction," 2001, JapanAcademic Association for Copyright Clearance, Tokyo, Japan."
Yamamoto et al, "Acquisition of Phrase-level Bilingual Correspondence using Dependency Structure" In Proceedings of COLING-2000, pp. 933-939.

(56) References Cited

OTHER PUBLICATIONS

"Yarowsky, David, "Unsupervised Word Sense Disambiguation Rivaling Supervised Methods," 1995, 33rd AnnualMeeting of the ACL, pp. 189-196."

Huang et al. Automatic Extraction of Named Entity Translingual Equivalence Based on Multi-Feature Cost Minimization. In Proceedings of the ACL 2003 Workshop on Multilingual and Mixed-Language Name Entry Recognition.

Notice of Allowance mailed Dec. 10, 2013 in Japanese Patent Application 2007-536911, filed Oct. 12, 2005.

Makoushina, J. "Translation Quality Assurance Tools: Current State and Future Approaches." Translating and the Computer, Dec. 17, 2007, 29, 1-39, retrieved at <http://www.palex.ru/fc/98/Translation%20Quality%Assurance%20Tools.pdf>.

Specia et al. "Improving the Confidence of Machine Translation Quality Estimates," MT Summit XII, Ottawa, Canada, 2009, 8 pages.

\* cited by examiner

CONTENT PAGE URL TRANSLATION

BACKGROUND OF THE INVENTION

The widespread use of the Internet allows people to view information from all over the world. People in one country may view web pages that are based in another country. Though this provides for widespread sharing of information, international web browsing may result in users of one country using one language viewing web content in a web page using a different language. As a result, people may not be able to read web page content from different countries using a different language.

Translation services for web pages exist but have several disadvantages. Typical web page translation services provide a translation of a sentence by detecting parts of the sentence, such as a noun, verb or other part. The translation of the sentence often relies on grammar rules for each language. Existing translation techniques do not apply well to content not having the structure of a sentence.

What is needed is an improved translation technique for web-based content.

SUMMARY OF THE INVENTION

The present technology may translate a content of a web page such as content locator (e.g., a uniform resource locator (URL)) from a source language to a target language. The content locator may be associated with a content page such as a web page or a portion of content page. The translation may involve dividing the content locator into segment tokens in a first language, followed by translating, transliterating or not changing a segment token. The processed tokens are then reassembled in a second language. The translation may be provided by a translation module, such as a network browser plug in, through a content page provided by a network browser. The translation may be performed based on translation account settings associated with the user. The account may be maintained by a remote machine translation service.

In an embodiment, a content locator may be translated by receiving a request by a network browser for a content page located at a content locator. A content page and the content locator may be associated with a first language. Next, a translation may automatically be provided for the content locator in a second language by the network browser. The network browser may include a translation module configured to provide the translation of the content locator to the network browser.

According to some embodiments, the present technology may be directed to methods for translating a content locator. The methods may comprise: (a) determining at least one segment of the content locator; (b) transforming the at least one segment from a source language into a target language by at least one of translation or transliteration; and (c) transmitting the transformed at least one segment in the target language for display on a network browser of a client device.

According to other embodiments, the present technology may be directed to systems for translating a content locator. The systems may include: (a) a memory for storing executable instructions; (b) a processor for executing the executable instructions; (c) a translation module stored in memory and executable by the processor to: (i) determine at least one segment of the content locator; and (ii) transform the at least one segment from a source language into a target language by at least one of translation or transliteration; and (d) a communications module stored in memory and executable by the processor to transmit the transformed at least one segment in the target language for display on a network browser of a client device.

According to additional embodiments, the present technology may be directed to non-transitory computer readable storage media having a computer program embodied thereon, the computer program may be executed by a processor in a computing system to perform a method for translating a content locator. The method may comprise: (a) determining at least one segment of the content locator; (b) transforming the at least one segment from a source language into a target language by at least one of translation or transliteration; and (c) transmitting the transformed at least one segment in the target language for display on a network browser of a client device.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DETAILED DESCRIPTION OF EXEMPLARY EMBODIMENTS

Figure 1:
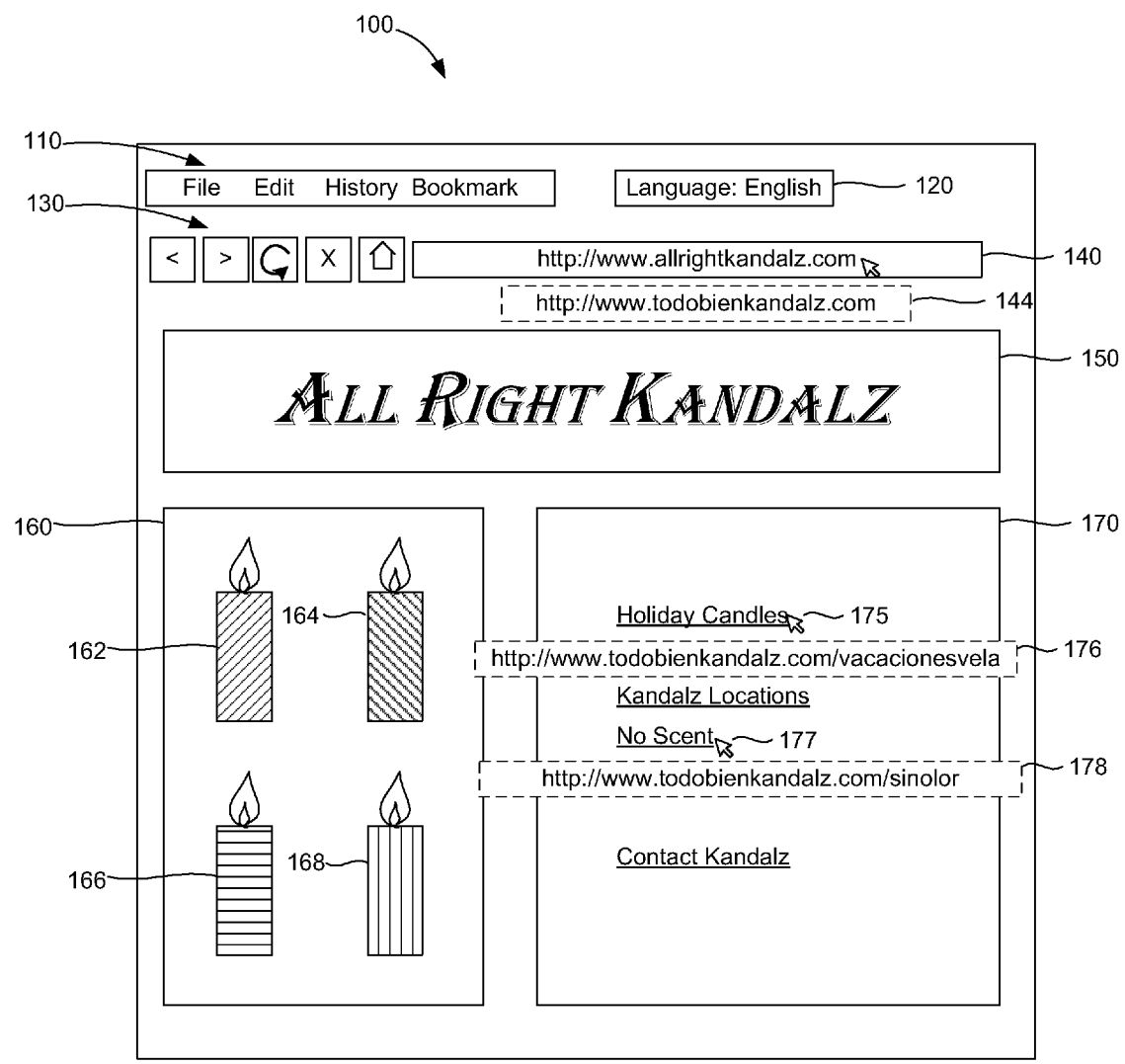
FIG. 1 illustrates an exemplary network browser interface with content locator translations.

Generally speaking, the use of non-roman characters in content locators such as uniform resource locators URLs has recently gained the approval of Internet authorities. Non-limiting examples of content locators include uniform resource indicators, uniform resource locators, uniform resource names, domain names, and so forth. One non-limiting example of a URL that comprises only roman characters includes http://www.example.com.

An exemplary content locator such as a domain name with non-roman characters may include www.你好吗.com. End users who browse the Internet may encounter such URLs and may not be able to understand them. Such non-roman URLs may confuse end users who are only familiar with roman character URLs, or those not familiar with the language of the URL.

Translation of these non-standard URLs may not be amicable to typical Machine Translation (MT) systems and methods because such technology translates content in traditional sentence formats. Often times, web addresses are not in any discernible sentence format. Web addresses may include multiple combined words, abbreviations, and other combinations of characters that may or may not have a sentence structure.

The present technology may transform non-roman URLs from a source language into one or more target languages.

The term transformation may include, but is not limited to, methods for converting characters or groups of characters from a source language into one or more target languages such as translation, transliteration, along with other processes that would be known to one of ordinary skill in the art with the present disclosure before them. Exemplary uses for such technology may include situations when an end user encounters a foreign web page (e.g., web page with content and content locators in a different language from their natural language) and is unable to read the URL. The present technology may provide mechanisms by which the end user may mouse over the URL box and generate a translation of the URL into one or more additional languages (for example, the language specified in the language preference of the browser). In additional embodiments, the present technology may automatically convert the content locators.

The present technology may translate a content of a web page such as content locator from a source language to a target language. The content locator may be associated with a content page such as a web page or a portion of content page. The translation may involve dividing the content locator into segment tokens in a first language, followed by translating, transliterating, or not changing a segment token. The processed tokens are then reassembled in a second language. The translation may be provided by a translation module, such as a network browser plugin, through a content page provided by a network browser. The translation may be performed based on translation account settings associated with the user or a common corporate account. Once downloaded and installed, the plugin may link to the account of a specific user within the company, and in other embodiments the plugin may be pointed to link to a common corporate account.

FIG. 1 illustrates an exemplary network browser interface with content locator translations. FIG. 1 includes an interface consisting of a content page 100 provided by a network browser.

Generally speaking, prior to accessing the content page 100, a translation plugin may be installed into the network browser. Examples of a network browser include "Internet Explorer" by Microsoft Corporation, "Firefox" by Mozilla, and other applications used for browsing content over a world wide web.

Once the plugin is installed, an end user may direct the translation plugin to "auto detect and translate to/from their source language setting (e.g., English)". A plurality of selectable target languages may be available for selection from a dropdown list.

For the duration of a browsing session, or until the preference is changed, the system may automatically translate content locators from a source language to one or more target languages. That is, once the end user has specified one or more target languages, the end user may enter a URL into the network browser, in source language such as English. The end user may then click on the plugin, which causes the system to automatically translate the URL into the closest match based on how the URL is segmented, along with which segments are transliterated, translated, and which segments remain unchanged.

It will be understood that if an end user directs the network browser to a URL that is in a different language from the target language specified in the plugin and/or encounter a URL embedded in a web page where the URL is in another language, mousing over the URL should provide same combined translation/transliteration/no change combination visual output in the target language.

Content page 100 may include content page drop down menu 110, translation module menu 120, content page operation buttons 130, content locator window 140, text box 144, a first content window 150, a second content window 160, and a third content window 170.

Content page 100 of FIG. 1 may include typical features of a network browser. For example, content page drop down menu 110 may include menus for file commands, edit commands, browsing history commands and bookmark commands. The drop down menus are used to configure the content page and the network browser operation. Content page operation buttons 130 may include a back button, forward button, refresh button, stop button and home button. These buttons are typical to those provided in a network browser interface.

Translation module menu 120 may be provided by a translation module and allows a user of the network browser to indicate a language in which to provide a translation of a content locator. The translation module menu 120 may be a "pull down" menu with a list of languages. A user may select a target language from translation module menu 120. Translated content will be provided in the selected target language.

Content locator window 140 may provide the content locator for the current page provided through the network browser. In some embodiments, the content locator window 140 may provide a uniform resource locator (URL) for the current content page provided by the network browser. For example, when a cursor is placed over the content locator window 140 as indicated in FIG. 1, a text box may be presented with a translation of the content locator in a target language as indicated by a text box 144. The translation of the content locator is part translator token and part copy. In some embodiments, the translation of the content locator may be presented to the user in a different way, such as within content locator window 140. The translation may be initiated by another type of input or event.

The first content window 150 indicates textual content which reads "all right kandalz". The second content window 160 illustrates four graphic images 162, 164, 166, and 168 depicting different types of candles. The third content window 170 includes a list of items associated with links. A corresponding content locator text box is provided for selected links. The text links are associated with different content pages, in this case within the domain of the present content page. When a cursor is placed over a link, or an object associated with a link, a translation for the link is provided in a target language. For example, the list includes "Holiday Candles", "Kandalz Locations", "No Scent" and a "contact" text. Cursor 175 is placed over the "Holiday Candles" text. Accordingly, a content locator text box with a translation of the link associated with the text is provided as text box 176. Cursor 177 is placed over the "No Scent" text, and a content locator text box 178 is provided with a translation of the corresponding link.

Figure 2A:
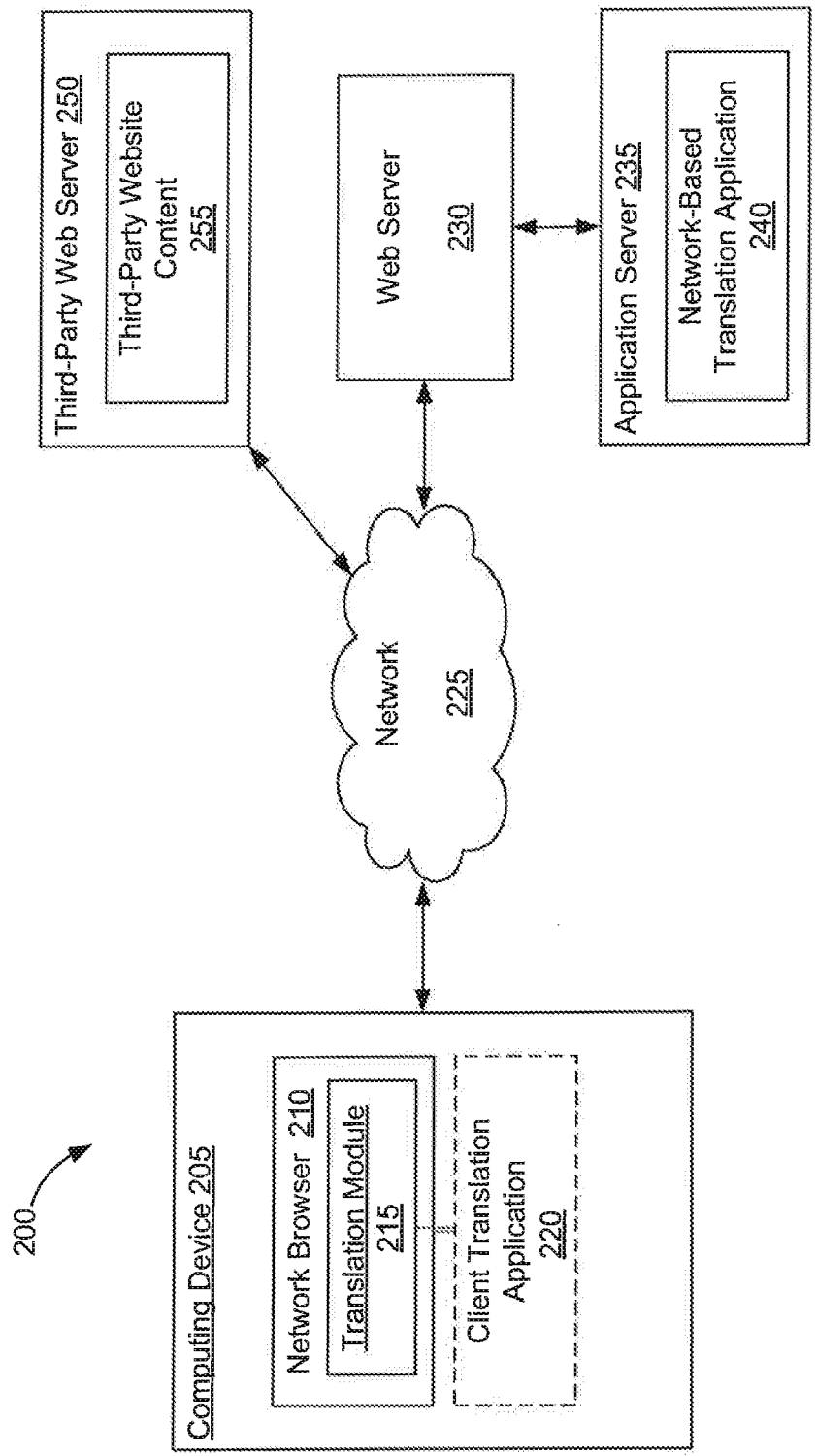
FIG. 2A is a block diagram of an exemplary system for providing machine translation.

FIG. 2A is a block diagram of an exemplary system 200 for providing machine translation. The system of FIG. 2A included computing device 205, network 225, third party web server 250, web server 230 and application server 235.

Computing device 205 communicates with network 225 and includes network browser 210. Computing device 205 may also include client translation application 220, which may operate similarly to network-based translation application 240 on the application server 235. Network browser 210 may be used to provide an interface such as that shown in FIG. 1. Examples of a network browser include "Internet Explorer" by Microsoft Corporation, "Firefox" by Mozilla, and other applications used for browsing content over a world wide web.

Translation module 215 may be used to coordinate a translation of a content locator or other content provided through a network browser interface including a content page, such as a URL processed with network browser 210. The translation module 215 may determine a target language to translate the content locator to, manage the translation and provide the translation through the network browser 210.

Network 225 may be a public or private local area network, wide area network, cloud-based networks or other network, or combinations of networks for facilitating the transfer of data between one or more devices or servers.

Third party web server 250 may include content page data provided through network browser 210. In particular, third party web server 250 may include third party web site content 255, which is provided through network browser 210. The content page data may be associated with a content locator.

Web server 230 may communicate with network 225 and application server 235 and may process requests received from computing device 205 over network 225. Web server 230 may process requests for content itself and request that application server 235 to process a received request. Application server 235 may provide a web-based application such as network-based translation application 240. Network-based translation application 240 may be an application server 235 or may be implemented as a client application (such as client translation application 220).

Figure 2B:
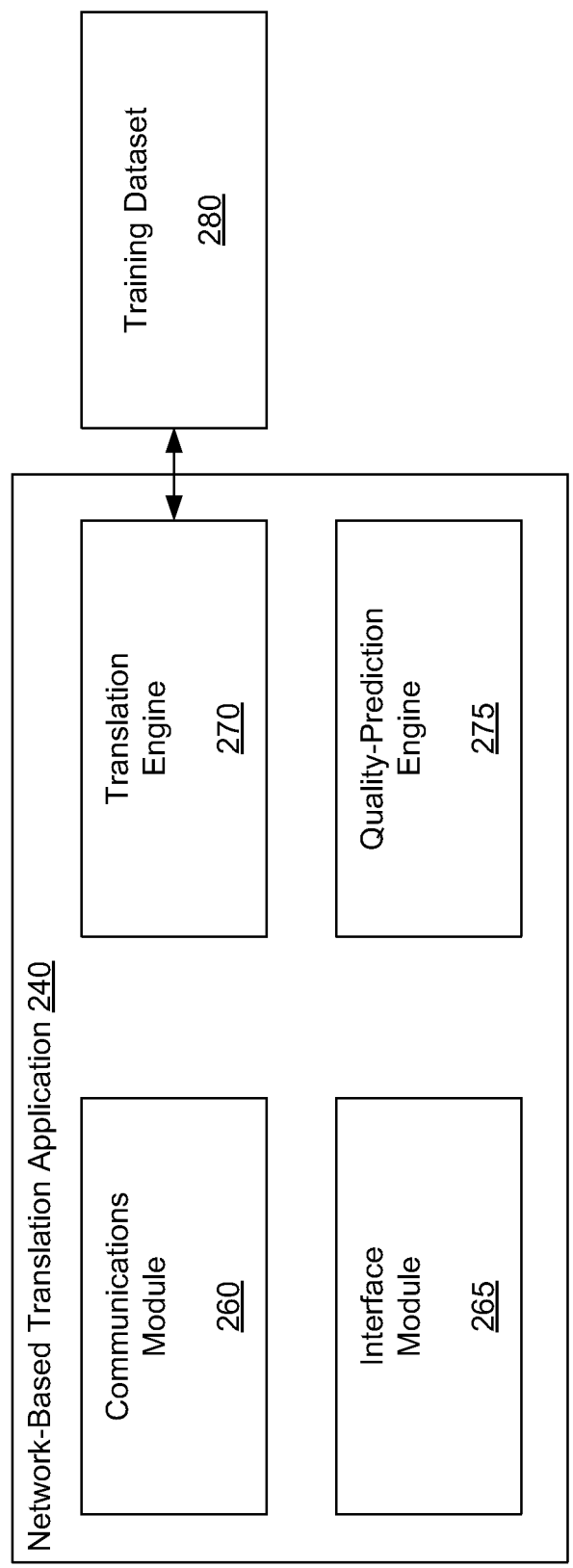
FIG. 2B is a block diagram of an exemplary network-based translation application.

FIG. 2B is a block diagram of an exemplary network-based translation application 240. Network-based translation application 240 may perform a translation in response to information received from translation module 215 of computing device 205.

Network-based translation application 240 may include communications module 260, interface module 265, translation engine 270, and quality prediction engine 275. Network-based translation application 240 may be executed to manage communication with a customer through customer computing device 205, interface with remote devices, translate a document to generate translated content, and provide a quality prediction of a generated translation. It is noteworthy that the network-based translation application 240 may include additional or fewer modules, engines, or components, and still fall within the scope of the present technology. As used herein, the term "module" may also refer to any of an application-specific integrated circuit (ASIC), an electronic circuit, a processor (shared, dedicated, or group) that executes one or more software or firmware programs, a combinational logic circuit, and/or other suitable components that provide the described functionality.

Communications module 260 may be executed to allow an indication to be received via a user interface to provide a translation of a document from a source language to a target language, as well as a prediction of a trust level of the translation. The communications module 260 may also facilitate accessing the document to be translated such as in response to an indication by a user.

The interface module 265 can be executed to provide a graphical user interface through a network browser 210, for example as a content page provided by a web browser, which enables a user to request the translation and corresponding trust-level prediction.

The translation engine 270 comprises a machine translation engine capable of translating from a source language to a target language. Such translation capability may result from training the translation engine 270 on various training data. In some embodiments, the network-based translation application 240 may include more than one translation engine 270. Additionally, the translation engine 270 may be based on statistical-translation techniques, non-statistical-translation techniques, or a combination thereof.

As depicted in FIG. 2B, the translation engine 270 is associated with the training dataset 280. According to other exemplary embodiments, the translation engine 270 can be associated with any number of training datasets. The training dataset 280 may comprise documents in source languages and corresponding translations of those documents in target languages (i.e., parallel corpora). The translated documents may be human-generated or machine-generated. The training dataset 280 may be domain-specific or generic.

According to exemplary embodiments, the quality-prediction engine 275 is executable to predict a trust level of a translation provided by the translation engine 270. The trust-level prediction is indicative of translational accuracy of translations generated by the translation engine 270. The granularity of the trust-level prediction may extend from translations or transliterations of single characters, segments of characters, or an entire content locator. The trust level is predicted independent of a human-generated translation or other human intervention.

An example of network-based translation application 240 is described in U.S. patent application Ser. No. 12/572,021, entitled "Providing Machine-Generated Translation and Corresponding Trust Levels," which was filed on Oct. 1, 2009, and is incorporated herein by reference in its entirety.

Figure 3:
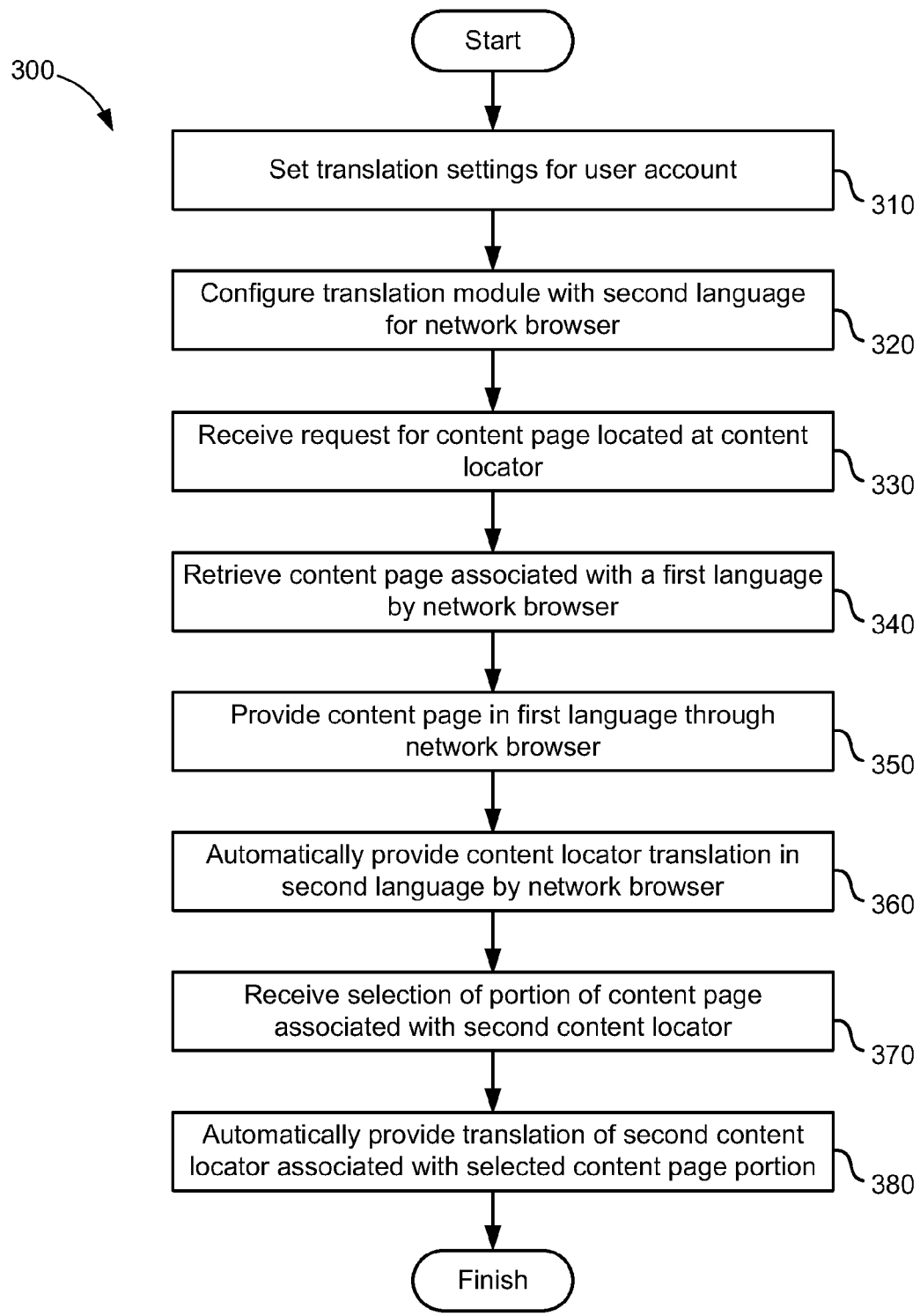
FIG. 3 is a flowchart of an exemplary method for providing a translation of a content locator.

FIG. 3 is a flowchart of an exemplary method 300 for providing a translation of a content locator. First, translation settings for a user account are set at step 310. It will be understood that in embodiments where the translation module 215 includes a plugin, the establishment of a user account may or may not be required. The translation settings may be set through a web service, for example, through web server 230 and stored by application server 235. The settings may identify translation and parameters for performing a translation on behalf of methods to a particular user, such as use of a dictionary, training system, weighting information, and other data. Translation settings may also include settings associated with quality level of a translation and other parameters of a translation.

A translation module 215 may be configured with a second language for a network browser 210 at step 320. A translation module, such as translation module 215 within a network browser 210, may receive input of a target language selection to which a URL or content locator may be translated. A translation module 215 may be implemented as a network browser plugin and may provide a drop down menu or other input mechanism for a user to select one or more target languages. In other embodiments, the translation module 215 may be implemented as an add in, script code or another suitable implementation (either hardware or software) within the network browser 210 or in communication with network browser 210 on computing device 205. When executed, the translation module 215 may accept an input of a selected language to utilize for translating content.

A request may be received for a content page located at a content locator at step 330. The request may be received as an input URL entered into the content locator window 140 of the content page 100, selection of a link or other content page portion that requires the content page be provided with a network browser 210, or a portion of a page such as an updated image or a frame within a content browser. The content locator may be an address or location at which content is stored, such as, for example, a URL.

A content page (or portion thereof) associated with a first language may be retrieved by a network browser 210 at step 340. The request may be sent to a web server 230 over a network. The web server 230 receives the request, processes the request and sends a content page to the requesting device back over the network, such as network 225. Processing the request may include providing the requested content directly via web server 230 or for web server 230 to query application server 235 for the requested content.

A content page may be provided in a first language through a network browser at step 350. At step 360, a content locator translation may be automatically provided in a second language by a network browser 210. The content locator translation may be provided based on several settings. The content locator may be translated according to one or more settings made by a user in their translation account. The content locator may be translated based on the target language selected by the user through preferences specified in a network browser 210 and the resulting content locator will be provided through the network browser interface. The content locator translation may provide a response to an input, such as placing a cursor over a URL window, or may be provided automatically. More detail for providing a content locator translation in a second window by a network browser 210 is discussed below with respect to the method of FIG. 4.

A selection is received with a portion of a content page associated with a second content locator at step 370. The selection may be a selection of a link, image, content page frame or some other portion of a content page. The content locator may be associated with the selected content page portion. At step 380, the translation of the second content locator is automatically provided. The second content locator may be associated with the selected content page portion. The second content locator may be translated similarly to the first content locator translation as discussed above with respect to step 360.

Figure 4:
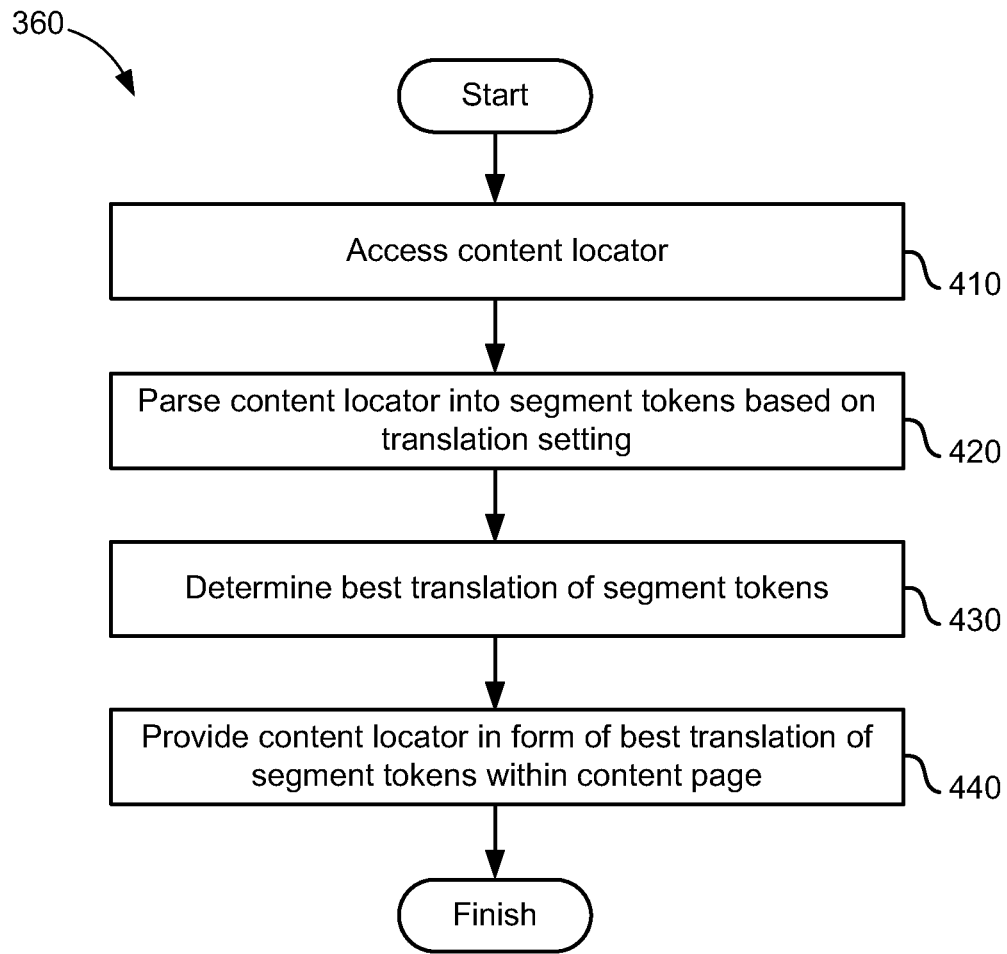
FIG. 4 is a flowchart of an exemplary method for translating a content locator.

FIG. 4 is a flowchart of an exemplary method for translating a content locator. In some embodiments, the method of FIG. 4 provides more detail for step 360 in the method of FIG. 3. A content locator is accessed at step 410. The content locator may be accessed by translation module 215. The translation module 215 may then send the content locator data as well as the selected target language, such as an indicator of the target language, to network-based translation application 240.

The content locator may be parsed into segment tokens based on translation settings at step 420. The translation may be performed by network-based translation application 240. The URL or content locator may be parsed to identify any recognized words in a first language within the content locator. Parsing may be performed within domain levels (for example, within back slashes of the content locator expression). Words may be identified by, for example using a dictionary, training sets of texts, and other data.

According to some embodiments, characters or segments not identified as a word within the content locator may then be analyzed to determine if they can be transliterated. Transliteration is a process which identifies a character in one language which may be translated into one or more characters of another language. Portions of the content locator which cannot be translated or transliterated may then be copied without translation.

In some instances, it may be appropriate to select a best translation for a segment token, such as when multiple possible translations for a content locator are determined by the translation module. Therefore, the method may include a step 430 of determining a best translation of the segment token may. The best translation may be based on known words, the context of the segment token, translations and/or transliteration, weighting, and other information. Determining a best translation of segment tokens is discussed in more detail below with respect to the method of FIG. 5.

A content locator may be provided in the form of a best translation of segment tokens within a content page at step 440. The content locator may be provided in a content page 100, for example within a text box 144, a content locator window 140 or URL window, or in some other manner.

Figure 5:
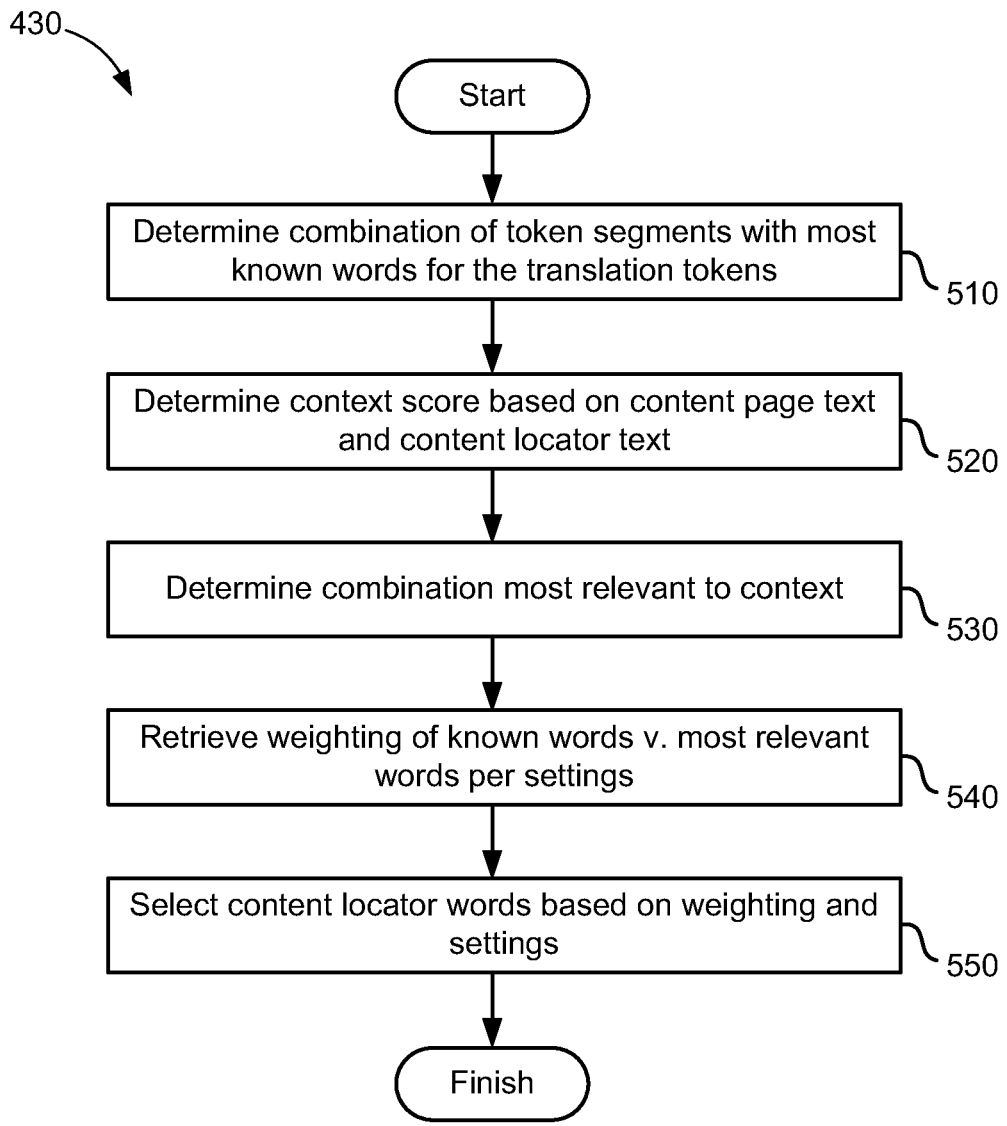
FIG. 5 is a flowchart of an exemplary method for translating a content locator.

FIG. 5 is a flowchart of an exemplary method for translating a content locator. In some embodiments, the method of FIG. 5 provides more detail for step 430 in the method of FIG. 4. Translation of a content locator may be based on several factors, such as a known translation, context information, and other features. The method of FIG. 5 utilizes both known translation and context information to optimize the translation of a content locator.

A combination of the token segments with the most words for the translation tokens is determined at step 510. Each token may have multiple translations, such as a word translation or transliteration, or multiple words or transliterations based on a probability structure. This plurality of translations may be referred to as a plurality of possible translations. A combination of token translations with the most known words is determined for the content locator at step 510.

Next, a context score is determined based on content page text and content locator text at step 520. The context score may be based on a match of a word to the subject matter of the content page, a word match, or other information. For example, a particular web page may be associated with a travel type subject matter, and thus words in the URL associated with travel may be determined to be a higher context score than words not associated with travel. Context may also be determined by matching identified words or transliteration content in the content locator to words detected in a content page, other tokens in web sites associated with the current domain and other related data.

A combination of tokens is determined that is most relevant to the context at step 530. The most relevant combination may be determined based on page content, other URLs, subject matters of a trained system and other data. The most relevant combination has the most words determined to match the content or have the highest average relevancy score.

The weighting of known words vs. most relevant words is retrieved as part of the translation settings for the user at step 540. Different weightings may be set for a recognized word, relevant word or other segment token or other content comprising the translation. The weightings may be retrieved as part of the account settings for a particular user. The weightings may be applied for each known word or relevant token translation within the content locator.

Content locator words are selected based on weighting and settings for a user at step 550. The combination with the highest score may be selected as the content locator translation.

Figure 6:
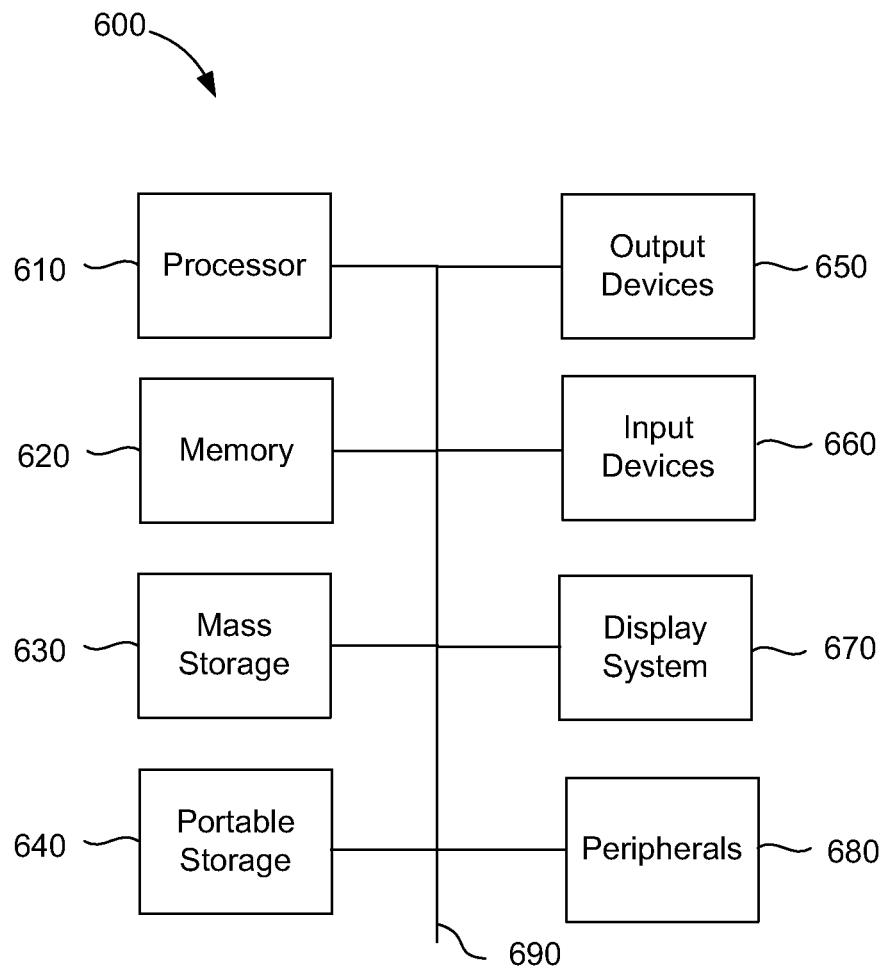
FIG. 6 is a block diagram of an exemplary computing device.

FIG. 6 is a block diagram of an exemplary computing device. The computing device of FIG. 6 may be used to implement computing device 205, web server 230, application server 235 and third party web server 250. The computing system 600 includes one or more processors 610 and main memory 620. Main memory 620 stores, in part, instructions and data for execution by processor 610. Main memory 620 can store the executable code when in operation. The computing system 600 further includes a mass storage device 630, portable storage medium drive(s) 640, output devices 650, user input devices 660, a display system 670, and peripheral device(s) 680.

The components shown in FIG. 6 are depicted as being connected via a single bus 690. The components may be connected through one or more data transport means. The processor 610 and the main memory 620 may be connected via a local microprocessor bus, and the mass storage device 630, the peripheral devices 680, the portable storage medium drive(s) 640, and display system 670 may be connected via one or more input/output (I/O) buses.

The mass storage device 630, which may be implemented with a magnetic disk drive or an optical disk drive, is a non-volatile storage device for storing data and instructions for use by the processor 610. The mass storage device 630 can store the system software for implementing embodiments of the present technology for purposes of loading that software into the main memory 620.

The portable storage medium drive(s) 640 operates in conjunction with a portable non-volatile storage medium, such as a floppy disk, compact disk, digital video disc, or Universal Serial Bus (USB) storage device, to input and output data and code to and from the computer system 600 of FIG. 6. The system software for implementing embodiments of the present technology may be stored on such a portable medium and input to the computer system 600 via the portable storage medium drive(s) 640.

The input devices 660 provide a portion of a user interface. The input devices 660 may include an alpha-numeric keypad, such as a keyboard, for inputting alpha-numeric and other information, or a pointing device, such as a mouse, a trackball, stylus, or cursor direction keys. Additionally, the computing system 600 as shown in FIG. 6 includes the output devices 650. Suitable output devices include speakers, printers, network interfaces, and monitors.

The display system 670 may include a liquid crystal display (LCD) or other suitable display device. The display system 670 receives textual and graphical information, and processes the information for output to the display device.

The peripheral device(s) 680 may include any type of computer support device to add additional functionality to the computer system. The peripheral device(s) 680 may include a modem or a router.

The components contained in the computer system 600 of FIG. 6 are those typically found in computer systems that may be suitable for use with embodiments of the present technology and are intended to represent a broad category of such computer components that are well known in the art. Thus, the computer system 600 of FIG. 6 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, webOS, Android, iPhone OS and other suitable operating systems.

It is noteworthy that any hardware platform suitable for performing the processing described herein is suitable for use with the technology. Computer-readable storage media refer to any medium or media that participate in providing instructions to a central processing unit (CPU), a processor, a microcontroller, or the like. Such media can take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a Compact Disc Read-Only Memory (CD-ROM) disk, Digital Video Disk (DVD), any other optical storage medium, Random Access Memory (RAM), Programmable Read-Only Memory (PROM), Erasable Programmable Read-Only Memory (EPROM), a Flash EPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A method for translating a content locator, the method comprising:
    determining at least one segment of the content locator;
    generating a plurality of possible transformations of the at least one segment;
    calculating a context score for each of the plurality of possible transformations by comparing each of the possible transformations to subject matter included in a document associated with the content locator;
    ranking each of the plurality of possible transformations by comparing the context scores of the plurality of possible transformations to one another;
    transforming the at least one segment from a source language into a target language by at least one of translation or transliteration; and
    transmitting the transformed at least one segment in the target language for display on a network browser of a client device.

2. The method according to claim 1, wherein determining comprises:
    determining one or more words included in the content locator that are to be translated from the source language into the target language, each of the one or more words being separated from the content locator as a segment; and
    analyzing the remaining portion of the content locator to determine one or more characters or words that are to be transliterated from the source language into the target language.

3. The method according to claim 1, further comprising:
    integrating back into the content locator, the at least one segment which was transformed; and
    transmitting the content locator having the integrated at least one segment to the client device.

4. The method according to claim 1, further comprising receiving an indication of a content locator that is to be translated, the indication generated by selection of the content locator by an input device coupled to the client device.

5. The method according to claim 1, wherein transformation comprises:
generating a trust value for the transformation of the at least one segment, the trust value including an accuracy for the transformation; and
utilizing the transformation of the at least one segment if the trust value for the at least one segment meets or exceeds a threshold value.

6. The method according to claim 1, wherein the content locator includes any of a uniform resource locator, a uniform resource indicator, a uniform resource name, a domain name, and combinations thereof.

7. The method according to claim 1, further comprising:
assigning a weight to each of the plurality of possible transformations, the weight being based upon a relative comparison of a possible transformation to a word in a parallel corpora; and
selecting a possible transformation with the highest weight based upon the comparison.

8. A method for transforming a content locator, the method comprising:
determining the content locator into two or more segments;
generating a plurality of possible transformations of the two or more segments;
calculating a context score for each of the plurality of possible transformations by comparing each of the possible transformations to subject matter included in a document associated with the content locator;
ranking each of the plurality of possible transformations by comparing the context scores of the plurality of possible transformations to one another;
transforming at least one of the two or more segments from a source language into at least one target language by at least one of translation or transliteration; and
combining the two or more segments together before transmitting the combined segments to a client device.

9. A system for translating a content locator, the system comprising:
a memory for storing executable instructions; a processor for executing the executable instructions;
a translation module stored in memory and executable by the processor to:
determine at least one segment of the content locator; and
transform the at least one segment from a source language into a target language by at least one of translation or transliteration;
a quality prediction engine that:
calculates a context score for each of a plurality of possible transformations by comparing each of the possible transformations to subject matter included in a document associated with the content locator; and
ranks each of the plurality of possible transformations by comparing the context scores of the plurality of possible transformations to one another; and
a communications module stored in memory and executable by the processor to transmit the transformed at least one segment in the target language for display on a network browser of a client device.

10. The system according to claim 9, wherein the translation module further:
determines one or more words included in the content locator that are to be translated from the source language into the target language, each of the one or more words being identified as a segment; and
analyzes the remaining portion of the content locator to determine one or more characters or words that are to be transliterated from the source language into the target language.

11. The system according to claim 9, wherein the translation module further integrates into the content locator the at least one segment which was transformed; and the communications module transmits the content locator having at least a portion that has been transformed from the source language into the target language.

12. The system according to claim 9, wherein the communications module receives an indication of a content locator that is to be translated, the indication generated by selection of the content locator by an input device coupled to the client device.

13. The system according to claim 9, wherein the quality prediction engine:
generates a trust value for the transformation of the at least one segment, the trust value including an accuracy for the transformation; and
utilizes the transformation of the at least one segment if the trust value for the at least one segment meets or exceeds a threshold value.

14. The system according to claim 13, wherein the quality prediction engine further:
assigns a weight to each of the plurality of possible transformations, the weight being based upon a relative comparison of a possible transformation to a word in a parallel corpora; and
selects a possible transformation with the highest weight based upon the comparison.

15. The system according to claim 9, wherein the content locator includes any of a uniform resource locator, a uniform resource indicator, a uniform resource name, a domain name, and combinations thereof.

16. The system according to claim 9, wherein the translation module includes a plugin that cooperates with a network browser that resides on the client device.

17. A non-transitory computer readable storage medium having a computer program embodied thereon, the computer program executable by a processor in a computing system to perform a method for translating a content locator, the method comprising:
determining at least one segment of the content locator;
generating a plurality of possible transformations of the at least one segment;
calculating a context score for each of the plurality of possible transformations by comparing each of the transformations to subject matter included in a document associated with the content locator;
ranking each of the plurality of possible transformations by comparing the context scores of the plurality of possible transformations to one another;
transforming the at least one segment from a source language into a target language by at least one of translation or transliteration; and
transmitting the transformed at least one segment in the target language for display on a network browser of a client device.

* * * * *